US011433597B2

(12) United States Patent
Ravich et al.

(10) Patent No.: US 11,433,597 B2
(45) Date of Patent: Sep. 6, 2022

(54) METHOD OF LAYERWISE FABRICATION OF A THREE-DIMENSIONAL OBJECT

(71) Applicant: Stratasys Ltd., Rehovot (IL)

(72) Inventors: Diana Ravich, Natania (IL); Ophira Melamed, Shoham (IL); Avraham Teken, Gan-Yavne (IL); Gavish Mida, Kibbutz Lehavot Haviva (IL); Avraham Levy, Petach-Tikva (IL); Cesar M. Manna, Rehovot (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 16/801,220

(22) Filed: Feb. 26, 2020

(65) Prior Publication Data

US 2020/0189179 A1  Jun. 18, 2020

Related U.S. Application Data

(63) Continuation of application No. 16/335,299, filed as application No. PCT/IB2017/055696 on Sep. 20, 2017, now Pat. No. 10,589,459.

(60) Provisional application No. 62/397,949, filed on Sep. 22, 2016.

(51) Int. Cl.
| | |
|---|---|
| *B29C 64/112* | (2017.01) |
| *B33Y 10/00* | (2015.01) |
| *C09D 11/101* | (2014.01) |
| *B33Y 70/00* | (2020.01) |
| *B29C 64/295* | (2017.01) |
| *B29C 64/106* | (2017.01) |
| *B29C 64/291* | (2017.01) |
| *B29C 35/08* | (2006.01) |
| *C09D 11/107* | (2014.01) |
| *C09D 11/30* | (2014.01) |
| *B33Y 80/00* | (2015.01) |
| *B29K 33/00* | (2006.01) |
| *B29K 105/00* | (2006.01) |
| *B29L 9/00* | (2006.01) |

(52) U.S. Cl.
CPC ........ *B29C 64/112* (2017.08); *B29C 35/0805* (2013.01); *B29C 64/106* (2017.08); *B29C 64/291* (2017.08); *B29C 64/295* (2017.08); *B33Y 10/00* (2014.12); *B33Y 70/00* (2014.12); *B33Y 80/00* (2014.12); *C09D 11/101* (2013.01); *C09D 11/107* (2013.01); *C09D 11/30* (2013.01); *B29C 2035/0827* (2013.01); *B29K 2033/08* (2013.01); *B29K 2033/12* (2013.01); *B29K 2105/0002* (2013.01); *B29K 2105/0094* (2013.01); *B29K 2995/007* (2013.01); *B29K 2995/0088* (2013.01); *B29K 2995/0089* (2013.01); *B29L 2009/00* (2013.01); *Y10T 428/2495* (2015.01); *Y10T 428/24777* (2015.01); *Y10T 428/24942* (2015.01)

(58) Field of Classification Search
CPC ... B29C 64/112; B29C 64/295; B29C 64/106; B29C 64/291; B29C 35/0805; B29C 2035/0827; B29C 64/30; B29C 64/209; B33Y 80/10; B33Y 10/00; B33Y 70/00; B33Y 40/20; C09D 11/101; C09D 11/107; C09D 11/30; Y10T 428/2495; Y10T 428/24942; Y10T 428/24777; B29K 2033/08; B29K 2033/12; B29K 2105/0002; B29K 2105/0094; B29K 2995/007; B29K 2995/0088; B29K 2995/0089; B29L 2009/00
See application file for complete search history.

(56) References Cited

U.S. PATENT DOCUMENTS

| | | |
|---|---|---|
| 6,259,962 B1 | 7/2001 | Gothait |
| 6,569,373 B2 | 5/2003 | Napadensky |
| 6,658,314 B1 | 12/2003 | Gothait |
| 6,850,334 B1 | 2/2005 | Gothait |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |

(Continued)

FOREIGN PATENT DOCUMENTS

| | | |
|---|---|---|
| CN | 1552017 | 12/2004 |
| CN | 103025506 | 4/2013 |

(Continued)

OTHER PUBLICATIONS

Translation Dated Oct. 23, 2020 Notification of Office Action dated Sep. 22, 2020 From the State Intellectual Property Office of the People's Republic of China Re. Application No. 201780072042.8. (9 Pages).

(Continued)

*Primary Examiner* — Jessica M Roswell

(57) ABSTRACT

A method of layerwise fabrication of a three-dimensional object is disclosed. The method comprises, for each of at least a few of the layers: dispensing at least a first modeling formulation and a second modeling formulation to form a core region using both the first and the second modeling formulations, and at least one envelope region at least partially surrounding the core region using one of the first and the second modeling formulations but not the other one of the first and the second modeling formulations. The method can also comprise exposing the layer to curing energy. The first modeling formulation is characterized, when hardened, by heat deflection temperature (HDT) of at least 90° C., and the second modeling formulation is characterized, when hardened, by Izod impact resistance (IR) value of at least 45 J/m.

20 Claims, 18 Drawing Sheets

(56) References Cited

U.S. PATENT DOCUMENTS

| | | | |
|---|---|---|---|
| 7,479,510 | B2 | 1/2009 | Napadensky et al. |
| 7,500,846 | B2 | 3/2009 | Eshed et al. |
| 7,962,237 | B2 | 6/2011 | Kritchman |
| 10,589,459 | B2 | 3/2020 | Ravich et al. |
| 2010/0191360 | A1 | 7/2010 | Napadensky et al. |
| 2013/0040091 | A1 | 2/2013 | Dikovsky et al. |
| 2013/0073068 | A1 | 3/2013 | Napadensky |
| 2015/0210010 | A1 | 7/2015 | Napadensky |
| 2016/0114458 | A1 | 4/2016 | Bajaj et al. |
| 2017/0260418 | A1 | 9/2017 | Wu et al. |
| 2019/0329488 | A1 | 10/2019 | Ravich et al. |
| 2020/0016822 | A1 | 1/2020 | Levy et al. |
| 2021/0221047 | A1 | 7/2021 | Levy |

FOREIGN PATENT DOCUMENTS

| | | |
|---|---|---|
| CN | 104582939 | 4/2015 |
| JP | 2013-525152 | 6/2013 |
| JP | 2016-078437 | 5/2016 |
| JP | 2017-105154 | 6/2017 |
| WO | WO 2011/135496 | 11/2011 |
| WO | WO 2015/056230 | 4/2015 |
| WO | WO 2015/139095 | 9/2015 |
| WO | WO 2016/125170 | 8/2016 |
| WO | WO 2018/055521 | 3/2018 |
| WO | WO 2018/055522 | 3/2018 |

OTHER PUBLICATIONS

Official Action dated Oct. 30, 2020 From the US Patent and Trademark Office Re. U.S. Appl. No. 16/335,305. (10 Pages).
Communication Pursuant to Article 94(3) EPC dated Jan. 13, 2021 From the European Patent Office Re. Application No. 17784014.7. (3 Pages).
Communication Pursuant to Article 94(3) EPC dated Feb. 26, 2020 From the European Patent Office Re. Application No. 17784014.7. (3 Pages).
Notification of Office Action and Search Report dated Jul. 5, 2021 From the State Intellectual Property Office of the People's Republic of China Re. Application No. 201780072042.8. (5 Pages).
Communication Pursuant to Article 94(3) EPC dated Sep. 2, 2019 From the European Patent Office Re. Application No. 17784014.7. (5 Pages).
Communication Relating to the Results of the Partial International Search dated Dec. 22, 2017 From the International Searching Authority Re. Application No. PCT/IB2017/055696. (12 Pages).
Ex Parte Quayle OA Dated Aug. 12, 2019 From the US Patent and Trademark Office Re. U.S. Appl. No. 16/335,299. (11 pages).
Grounds of Reasons for Rejection dated May 27, 2019 From the Korean Intellectual Property Office Re. Application No. 10-2019-7011603 and Its Translation Into English. (6 Pages).
Grounds of Reasons of Rejection dated Sep. 23, 2019 From the Korean Intellectual Property Office Re. Application No. 10-2019-7011603 and Its Translation Into English. (5 Pages).
International Preliminary Report on Patentability dated Apr. 4, 2019 From the International Bureau of WIPO Re. Application No. PCT/IB2017/055,692. (8 Pages).
International Preliminary Report on Patentability dated Apr. 4, 2019 From the International Bureau of WIPO Re. Application No. PCT/IB2017/055696. (10 Pages).
International Search Report and the Written Opinion dated Feb. 15, 2018 From the International Searching Authority Re. Application No. PCT/IB2017/055696. (18 Pages).
International Search Report and the Written Opinion dated Dec. 21, 2017 From the International Searching Authority Re. Application No. PCT/IB2017/055692. (14 Pages).
Notice of Reason for Rejection dated Mar. 3, 2020 From the Japan Patent Office Re. Application No. 2019-515878 and Its Translation Into English. (10 Pages).
Notice of Reason for Rejection dated Oct. 4, 2019 From the Japan Patent Office Re. Application No. 2019-515878 and Its Translation Into English. (9 Pages).
Notification of Office Action and Search Report dated Nov. 11, 2019 From the State Intellectual Property Office of the People's Republic of China Re. Application No. 201780072008.0 and Its Translation of Office Action Into English. (10 Pages).
Office Acton dated Jul. 15, 2019 From the Israel Patent Office Re. Application No. 265543 and its Translation into English. (4 Pages).
Restriction Official Action dated Apr. 22, 2020 from the US Patent and Trademark Office Re. U.S. Appl. No. 16/335,305. (5 pages).
Office Action dated Sep. 29, 2020 From the Israel Patent Office Re. Application No. 272959 and Its Translation Into English. (5 Pages).
Notification of Office Action and Search Report dated Sep. 22, 2020 From the State Intellectual Property Office of the People's Republic of China Re. Application No. 201780072042.8. (8 Pages).
Official Action dated Jul. 16, 2020 from the US Patent and Trademark Office Re. U.S. Appl. No. 16/335,305. (30 pages).
Translation Dated Jul. 27, 2021 of Notification of Office Action dated Jul. 5, 2021 From the State Intellectual Property Office of the People's Republic of China Re. Application No. 200880024068.(10 Pages).
Office Action dated Dec. 16, 2021 From the Israel Patent Office Re. Application No. 265544 and Its Translation Into English. (5 Pages).
Communication Pursuant to Article 94(3) EPC dated Feb. 11, 2022 From the European Patent Office Re. Application No. 17783586.5. (7 Pages).
Notice of Reason(s) for Rejection dated Sep. 3, 2021 From the Japan Patent Office Re. Application No. 2019-515816 and Its Translation Into English. (6 Pages).

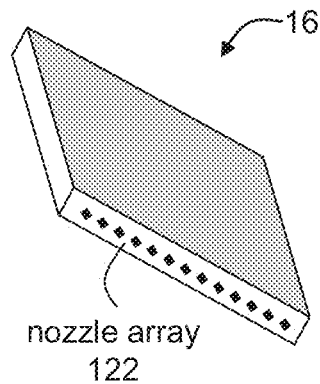 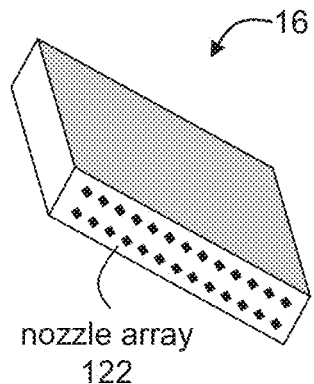
FIG. 6A  FIG. 6B
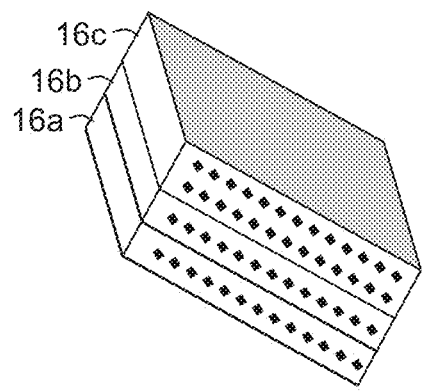
FIG. 6C

METHOD OF LAYERWISE FABRICATION OF A THREE-DIMENSIONAL OBJECT

RELATED APPLICATIONS

This application is a continuation of U.S. patent application Ser. No. 16/335,299 filed on Mar. 21, 2019, which is a National Phase of PCT Patent Application No. PCT/IB2017/055696 having International Filing Date of Sep. 20, 2017, which claims the benefit of priority under 35 USC § 119(e) of U.S. Provisional Patent Application No. 62/397,949 filed on Sep. 22, 2016. The contents of the above applications are all incorporated by reference as if fully set forth herein in their entirety.

FIELD AND BACKGROUND OF THE INVENTION

The present invention, in some embodiments thereof, relates to Additive Manufacturing (AM) of an object, and, more particularly, but not exclusively, to formulations, methods and systems for additive manufacturing of an object which exhibits desirable mechanical properties, for example, a desirable Heat Deflection Temperature (HDT) without compromising other properties.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment which manufacture a three-dimensional structure in a layerwise manner.

Various AM technologies exist, amongst which are stereolithography, digital light processing (DLP), and three dimensional (3D) printing, 3D inkjet printing in particular. Such techniques are generally performed by layer by layer deposition and solidification of one or building materials, typically photopolymerizable (photocurable) materials.

Stereolithography, for example, is an additive manufacturing process which employs a liquid UV-curable building material and a UV laser. In such a process, for each dispensed layer of the building material, the laser beam traces a cross-section of the part pattern on the surface of the dispensed liquid building material. Exposure to the UV laser light cures and solidifies the pattern traced on the building material and joins it to the layer below. After being built, the formed parts are immersed in a chemical bath in order to be cleaned of excess building material and are subsequently cured in an ultraviolet oven.

In three-dimensional inkjet printing processes, for example, a building material is dispensed from a dispensing head having a set of nozzles to deposit layers on a supporting structure. Depending on the building material, the layers may then be cured or solidified using a suitable device.

Various three-dimensional inkjet printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237, 9,031,680 and U.S. Patent Application having Publication No. 2015/0210010, all of the same Assignee.

A printing system utilized in additive manufacturing may include a receiving medium and one or more printing heads. The receiving medium can be, for example, a fabrication tray that may include a horizontal surface to carry the material dispensed from the printing head. The printing head may be, for example, an ink jet head having a plurality of dispensing nozzles arranged in an array of one or more rows along the longitudinal axis of the printing head. The printing head may be located such that its longitudinal axis is substantially parallel to the indexing direction. The printing system may further include a controller, such as a microprocessor to control the printing process, including the movement of the printing head according to a pre-defined scanning plan (e.g., a CAD configuration converted to a Stereo Lithography (STL) format and programmed into the controller). The printing head may include a plurality of jetting nozzles. The jetting nozzles dispense material onto the receiving medium to create the layers representing cross sections of a 3D object.

In addition to the printing head, there may be a source of curing energy, for curing the dispensed building material. The curing energy is typically radiation, for example, UV radiation.

Additionally, the printing system may include a leveling device for leveling and/or establishing the height of each layer after deposition and at least partial solidification, prior to the deposition of a subsequent layer.

The building materials may include modeling materials and support materials, which form the object and the temporary support constructions supporting the object as it is being built, respectively.

The modeling material (which may include one or more material) is deposited to produce the desired object/s and the support material (which may include one or more materials) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently hardened, typically upon exposure to curing energy (e.g., UV curing), to form the required layer shape. After printing completion, support structures are removed to reveal the final shape of the fabricated 3D object.

Several additive manufacturing processes allow additive formation of objects using more than one modeling material. For example, U.S. Patent Application having Publication No. 2010/0191360 of the present Assignee, discloses a system which comprises a solid freeform fabrication apparatus having a plurality of dispensing heads, a building material supply apparatus configured to supply a plurality of building materials to the fabrication apparatus, and a control unit configured for controlling the fabrication and supply apparatus. The system has several operation modes. In one mode, all dispensing heads operate during a single building scan cycle of the fabrication apparatus. In another mode, one or more of the dispensing heads is not operative during a single building scan cycle or part thereof.

In a 3D inkjet printing process such as Polyjet™ (Stratasys Ltd., Israel), the building material is selectively jetted from one or more printing heads and deposited onto a fabrication tray in consecutive layers according to a pre-determined configuration as defined by a software file.

When a cured rigid modeling material forms the final object, the cured material should preferably exhibit heat deflection temperature (HDT) which is higher than room temperature, in order to assure its usability. Typically, the cured modeling material should exhibit HDT of at least 35° C. For an object to be stable in variable conditions, a higher HDT is desirable.

U.S. Patent Application having Publication No. 2013/0040091, by the present assignee, discloses methods and systems for solid freeform fabrication of shelled objects, constructed from a plurality of layers and a layered core constituting core regions and a layered shell constituting envelope regions.

SUMMARY OF THE INVENTION

According to an aspect of some embodiments of the present invention there is provided a method of layerwise fabrication of a three-dimensional object. The method comprises, for each of at least a few of the layers: dispensing at least a first modeling formulation and a second modeling formulation to form a core region using both the first and the second modeling formulations, and at least one envelope region at least partially surrounding the core region using one of the first and the second modeling formulations but not the other one of the first and the second modeling formulations. The method optionally and preferably also comprises exposing the layer to curing energy. The first modeling formulation is optionally and preferably characterized, when hardened, by heat deflection temperature (HDT) of at least 90° C., and the second modeling formulation is characterized, when hardened, by Izod impact resistance (IR) value of at least 45 J/m.

According to some embodiments of the invention a ratio between elastic moduli of the first and the second modeling formulations, when hardened, ranges from 2.7 to 2.9.

According to an aspect of some embodiments of the present invention there is provided a method of layerwise fabrication of a three-dimensional object. The method comprises, for each of at least a few of the layers: dispensing at least a first modeling formulation and a second modeling formulation to form a core region using both the first and the second modeling formulations, and at least one envelope region at least partially surrounding the core region using one of the first and the second modeling formulations but not the other one of the first and the second modeling formulations. The method optionally and preferably also comprises exposing the layer to curing energy. A ratio between elastic moduli of the first and the second modeling formulations, when hardened, optionally and preferably ranges from 2.7 to 2.9.

According to some embodiments of the invention the first modeling formulation comprises: at least one curable acrylic monomer characterized, when hardened, by Tg of at least 85° C., as described herein in any of the respective embodiments; at least one curable methacrylic monomer characterized, when hardened, by Tg of at least 150° C., as described herein in any of the respective embodiments; at least one curable (meth)acrylic oligomer, characterized, when hardened, by Tg of at least 50° C., as described herein in any of the respective embodiments; and optionally, at least one curable (meth)acrylic monomer characterized, when hardened, by Tg lower than 0° C., as described herein in any of the respective embodiments, wherein a concentration of the curable methacrylic monomer is at least 35% by weight of the total weight of the first modeling formulation.

According to some embodiments of the invention the second modeling formulation comprises: at least one curable (meth)acrylic monomer characterized, when hardened, by Tg of at least 70° C., as described herein in any of the respective embodiments; at least one curable (meth)acrylic oligomer characterized, when hardened, by Tg of at least 10° C., as described herein in any of the respective embodiments; and at least one curable (meth)acrylic monomer which comprises at least 5 ethoxylated groups (an ethoxylated curable material) and is characterized, when hardened, by Tg lower than −20° C., as described herein in any of the respective embodiments, wherein a concentration of the ethoxylated curable material is at least 5 weight percents of the total weight of the second modeling formulation.

According to an aspect of some embodiments of the present invention there is provided a method of layerwise fabrication of a three-dimensional object. The method comprises, for each of at least a few of the layers: dispensing at least a first modeling formulation and a second modeling formulation to form a core region using both the first and the second modeling formulations, and at least one envelope region at least partially surrounding the core region using one of the first and the second modeling formulations but not the other one of the first and the second modeling formulations; and exposing the layer to curing energy. Preferably, the first modeling formulation comprises: at least one curable acrylic monomer characterized, when hardened, by Tg of at least 85° C.; at least one curable methacrylic monomer characterized, when hardened, by Tg of at least 150° C.; at least one curable (meth)acrylic oligomer, characterized, when hardened, by Tg of at least 50° C.; and, optionally, at least one curable (meth)acrylic monomer characterized, when hardened, by Tg lower than 0° C. Preferably, a concentration of the curable methacrylic monomer is at least 35% by weight of the total weight of the first modeling formulation. Preferably, the second modeling formulation comprises: at least one curable (meth)acrylic monomer characterized, when hardened, by Tg of at least 70° C.; at least one curable (meth)acrylic oligomer characterized, when hardened, by Tg of at least 10° C.; and at least one curable (meth)acrylic monomer which comprises at least 5 ethoxylated groups and is characterized, when hardened, by Tg lower than −20° C. Preferably, a concentration of the ethoxylated curable material is at least 5 weight percents of the total weight of the second modeling formulation.

According to some embodiments of the invention the curable methacrylic monomer in the first modeling formulation is characterized by a curing rate lower than 4400 mW/minute.

According to some embodiments of the invention, a concentration of the curable methacrylic monomer in the first formulation ranges from 35 to 50% by weight, of the total weight of the first modeling formulation.

According to some embodiments of the invention a concentration of the curable acrylic monomer in the first formulation ranges from 10 to 40% by weight of the total weight of the first modeling formulation.

According to some embodiments of the invention a concentration of the (meth)acrylic oligomer is the first modeling formulation ranges from 10 to 40% by weight of the total weight of the first modeling formulation.

According to some embodiments of the invention the ethoxylated curable monomer is characterized by at least one of a viscosity at room temperature lower than 1000 centipoises; and a molecular weight of at least 500 grams/mol.

According to some embodiments of the invention a concentration of the ethoxylated curable monomer in the second modeling formulation ranges from 10 to 50% by weight of the total weight of the second modeling formulation.

According to some embodiments of the invention a concentration of the curable (meth)acrylic monomer in the second modeling formulation ranges from 10 to 50% by weight of the total weight of the second modeling formulation.

According to some embodiments of the invention a concentration of the curable (meth)acrylic oligomer in the second modeling formulation ranges from 10 to 50% by weight of the total weight of the second modeling formulation.

According to some embodiments of the invention the first and/or second modeling material formulation further comprises an initiator for initiating the curing.

According to some embodiments of the invention a concentration of the initiator in the first and/or the second modeling material formulation independently ranges from 0.5 to 5% by weight of the total weight of the respective formulation.

According to some embodiments of the invention the first and/or second modeling material formulation independently further comprises at least one of a surfactant, a dispersing agent and an inhibitor.

According to some embodiments of the invention the first modeling material formulation is characterized, when hardened, by heat deflection temperature (HDT) of at least 90° C.

According to some embodiments of the invention the second modeling material formulation is characterized, when hardened, Izod impact resistance (IR) value of at least 45 J/m.

According to some embodiments of the invention the second modeling formulation is characterized, when hardened, by HDT lower than 50° C., or lower than 45° C.

According to some embodiments of the invention the object is constructed from a plurality of layers, a layered core constituting core regions and at least one layered shell constituting envelope regions.

According to some embodiments of the invention there are two envelope regions.

According to some embodiments of the invention the dispensing is in a voxelated manner, wherein a thickness of an inner envelope region of the two envelope regions is from about 0.1 mm to about 4 mm, and wherein a thickness of an outer envelope region of the two envelope regions is from about 150 microns to about 600 microns.

According to some embodiments of the invention there is an additional envelope region between the inner envelope region and the outer envelope region.

According to some embodiments of the invention the additional envelope region has a thickness less than the thickness of the inner envelope region and less than the thickness of the outer envelope region.

According to some embodiments of the invention the thickness of the additional envelope region is from about 70 microns to about 100 microns.

According to some embodiments of the invention an amount of the first modeling formulation is the core region is higher than 25% by weight of a total weight of the core region.

According to some embodiments of the invention the dispensing is in a voxelated manner, and wherein voxels of the first modeling formulation are interlaced with voxels and the second modeling formulation within the core region.

According to some embodiments of the invention there are two envelope regions, wherein a thickness of an inner envelope region of the two envelope regions is from about 1 to about 5 microns, and wherein a thickness of an outer envelope region of the two envelope regions is a few voxels.

According to some embodiments of the invention the core region, when hardened, is characterized by HDT of at least 60° C.

According to some embodiments of the invention the method comprises, during the dispensing and/or the exposure to the curing energy, exposing the layers to heat.

According to some embodiments of the invention the exposure to the heat comprises heating to a temperature which is below the HDT of the first modeling formulation.

According to some embodiments of the invention the temperature is at least 10° C. below the HDT of the first formulation.

According to some embodiments of the invention the temperature is above an HDT of the second modeling formulation.

According to some embodiments of the invention the exposure to the heat comprises heating to a temperature of at least 40° C. According to some embodiments of the invention the heating is to a temperature that ranges from about 40° C. to about 60° C.

According to some embodiments of the invention the exposure to the heat is effected by heat conduction. According to some embodiments of the invention the exposure to the heat is effected by radiation. According to some embodiments of the invention the exposure to the heat is effected by heat convection.

According to some embodiments of the invention the curing energy comprises UV irradiation. According to some embodiments of the invention each of the curable materials in the first and the second formulations is a UV curable material.

According to some embodiments of the invention the method comprises, subsequent to the exposing, heating the object.

According to some embodiments of the invention the heating is at a temperature of at least 120° C., and for a time period of at least 1 hour.

According to some embodiments of the invention the first and the second modeling formulations, and a mode of the dispensing, are selected such that the object is characterized by HDT of at least 100° C., or at least 130° C., or at least 140° C.

According to some embodiments of the invention the first and the second modeling formulations and a mode of the dispensing, are selected such that the object is characterized by Izod notch impact resistance of at least 100 J/m.

According to some embodiments of the invention the object features curling of less than 4 mm, or less than 3 mm.

According to an aspect of some embodiments of the present invention there is provided a method of layerwise solid freeform fabrication of a three-dimensional object. The method comprises, for each of at least a few of the layers: dispensing at least a first modeling formulation and a second modeling formulation in a voxelated manner to form in the layer a region in which voxels of the first modeling formulation are interlaced with voxels and the second modeling formulation; and exposing the layers to curing energy. Preferably, the first modeling formulation is characterized as providing, upon exposure to the curing energy, a cured material featuring heat deflection temperature (HDT) of at least 90° C., and the second modeling formulation is characterized as providing, upon exposure to the curing energy, a cured material featuring Izod impact resistance (IR) value of at least 45 J/m. Preferably, a ratio between elastic moduli of the first and the second modeling formulations, when hardened, is from less than 3; and/or wherein the first and the second modeling formulations are as delineated above and optionally as further exemplified below.

According to some embodiments of the invention the region is a core region within the layer, and the method comprises dispensing one of the first and the second modeling formulations but not the other one of the first and the second modeling formulations to form in the layer at least one envelope region at least partially surrounding the core region.

According to some embodiments of the invention the first modeling formation is in an amount higher than 25% by weight of the total weight of the region.

According to some embodiments of the invention the first and the second formulations and an amount of the first formulation in the region are selected such that the region, when hardened, is characterized by HDT of at least 60° C.

According to some embodiments of the invention the invention the method comprises, during the dispensing, subjecting the layer to heat.

According to some embodiments of the invention the subjecting the layer to heat is as delineated above and optionally as further exemplified below.

According to some embodiments of the invention the method comprises dispensing a plurality of layers to form a pedestal, prior to a dispensing of a bottommost layer of the object.

According to some embodiments of the invention the pedestal has a core-shell structure.

According to some embodiments of the invention the dispensing the plurality of layers to form the pedestal, comprises, for each of at least a few layers of the pedestal, dispensing a support formulation to form a core region in the layer, and a combination of a support formulation and a modeling formulation to form in the According to some embodiments of the invention a stack of the envelope regions forms a layered shell and a stack of the core regions forms a layered core.

According to some embodiments of the invention the layered shell comprises spaced pillars of the modeling formulation and support formulation filling the spaces between the pillars.

According to some embodiments of the invention the layered core comprises the support formulation and is devoid of any modeling formulation.

According to an aspect of some embodiments of the present invention there is provided a kit comprising at least two modeling material formulations for fabricating a three-dimensional object. The kit comprises at least a first modeling formulation and a second modeling formulation. The first modeling formulation preferably comprises: at least one curable acrylic monomer characterized as providing, upon exposure to the curing energy, a cured material featuring Tg of at least 85° C.; at least one curable methacrylic monomer characterized as providing, upon exposure to the curing energy, a cured material featuring Tg of at least 150° C.; at least one curable (meth)acrylic oligomer, characterized as providing, upon exposure to the curing energy, a cured material featuring Tg of at least 50° C.; and optionally, at least one curable (meth)acrylic monomer characterized as providing, upon exposure to the curing energy, a cured material featuring Tg lower than 0° C., wherein a concentration of the curable methacrylic monomer is at least 35% by weight of the total weight of the first modeling formulation. The second modeling formulation preferably comprises: at least one curable (meth)acrylic monomer characterized as providing, upon exposure to the curing energy, a cured material featuring Tg of at least 70° C.; at least one curable (meth)acrylic oligomer characterized as providing, upon exposure to the curing energy, a cured material featuring Tg of at least 10° C.; and at least one curable (meth)acrylic monomer which comprises at least 5 ethoxylated groups and is characterized by a viscosity at room temperature lower than 1000 centipoises; and a molecular weight of at least 500 grams/mol, wherein a concentration of the ethoxylated curable material is at least 5 weight percents of the total weight of the second modeling formulation.

According to some embodiments of the invention the first and second modeling formulations are packaged separately within the kit.

According to some embodiments of the invention the kit comprises at least one initiator for initiating curing of the first and/or the second formulation.

According to an aspect of some embodiments of the present invention there is provided a method of fabricating a three-dimensional object. The method comprises: within a chamber of solid freeform fabrication apparatus, sequentially forming a plurality of layers in a configured pattern corresponding to the shape of the object, wherein, for each of at least a few of the layers, the formation of the layer comprises: dispensing at least a first modeling formulation and a second modeling formulation to form a core region using both the first and the second modeling formulations, and at least one envelope region at least partially surrounding the core region using one of the first and the second modeling formulations but not the other one of the first and the second modeling formulations. The method preferably comprises exposing the layer to non-thermal curing energy, and heating the chamber to a temperature of at least 40° C.

According to an aspect of some embodiments of the present invention there is provided a three-dimensional printing system. The system comprises: a plurality of inkjet printing heads each having a circuit controllably dispensing a different type of modeling material; a tray for receiving modeling materials dispensed by the inkjet printing heads a curing device configured for applying curing energy; a thermal screen for thermally separating the circuits from a space between the inkjet printing heads and the tray; and a heating system for heating the space.

According to some embodiments of the invention the heating system comprises a source of thermal radiation positioned in the space to deliver heat to the dispensed modeling material by radiation.

According to some embodiments of the invention the heating system comprises a blower positioned outside the space for delivering heat to the dispensed modeling material by convection.

According to some embodiments of the invention the heating system comprises a tray heater in thermal contact with a back side of the tray for delivering heat to the dispensed modeling material by heat conduction.

According to some embodiments of the invention the thermal screen is foldable and collapsible, and is positioned to simultaneously fold at one side of the inkjet printing heads and expand at an opposite side of inkjet printing heads during a motion of the inkjet printing heads.

According to an aspect of some embodiments of the present invention there is provided a three-dimensional object obtained in layerwise solid freeform fabrication. The object comprises at least one core region and at least one envelope region at least partially surrounding the core region, the object being characterized by: a heat deflection temperature (HDT) of at least 100° C.; an Izod impact resistance (IR) value of at least 100 J/m; and a curling of less than 4 mm, or less than 3 mm.

According to an aspect of some embodiments of the present invention there is provided a method of layerwise fabrication of a three-dimensional object. The method comprises: dispensing a plurality of pedestal layers to form a layered pedestal having a core-shell structure; and dispensing a plurality of object layers to form the object on top of the pedestal.

According to some embodiments of the invention the dispensing of the plurality of pedestal layers, comprises, for at least a few pedestal layers, dispensing a support formulation to form a core region in the layer, and a combination of a support formulation and a modeling formulation to form in the layer an envelope region at least partially surrounding the core region, wherein a stack of the envelope regions forms a layered shell and a stack of the core regions forms a layered core.

According to some embodiments of the invention the core-shell structure comprises a layered core made of a first support formulation and being devoid of any modeling formulation, and a layered shell formed of a combination of a modeling formulation and a second support formulation.

According to some embodiments of the invention the core-shell structure comprises a layered shell having spaced pillars made of a modeling formulation, and a support formulation filling the spaces between the pillars.

According to some embodiments of the invention the dispensing the plurality of object layers comprises, for at least a few object layers, dispensing a first modeling formulation and a second modeling formulation to form a core region using both the first and the second modeling formulations, and at least one envelope region at least partially surrounding the core region using one of the first and the second modeling formulations but not the other one of the first and the second modeling formulations.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 6A-6C are schematic illustrations of printing heads according to some embodiments of the present invention;

DESCRIPTION OF SPECIFIC EMBODIMENTS OF THE INVENTION

Figure 1A:
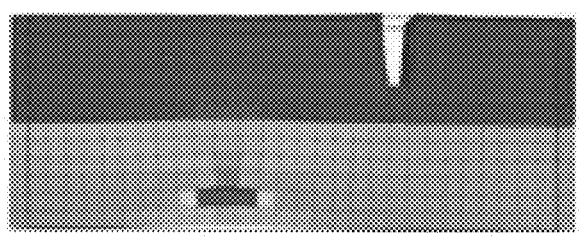
FIGS. 1A-1G show results of computer simulations performed in accordance with some embodiments of the present invention to analyze stress distribution resulting from a crack in a modeling formulation.
Figure 1B:
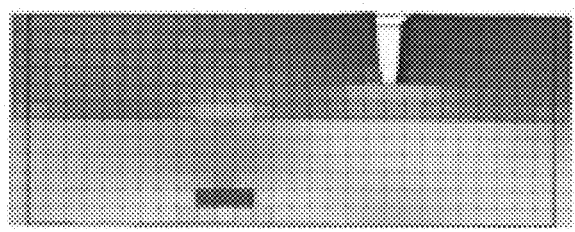
Figure 1C:
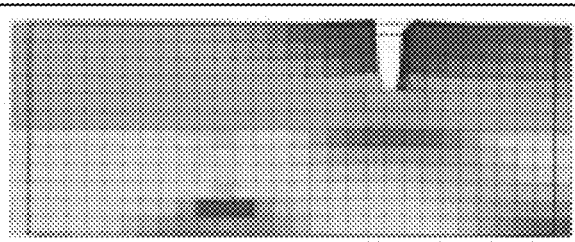
Figure 1D:
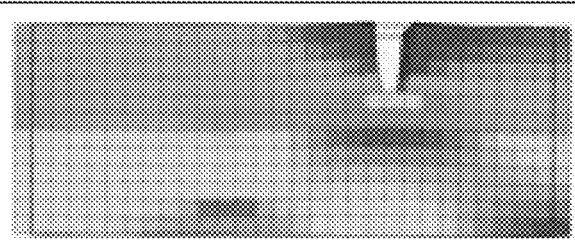
Figure 1E:
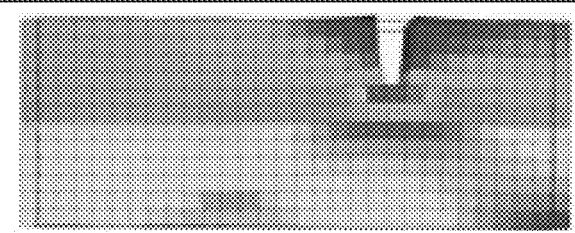
Figure 1F:
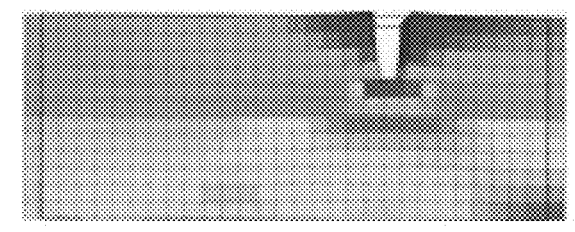
Figure 1G:
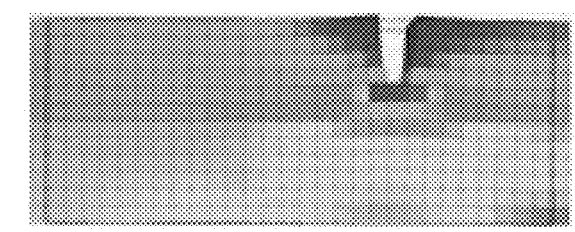

The present invention, in some embodiments thereof, relates to Additive Manufacturing (AM) of an object, and, more particularly, but not exclusively, to formulations, methods and systems for additive manufacturing of an object which exhibits desirable mechanical properties, for example, a desirable Heat Deflection Temperature (HDT) without compromising other properties.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention the AM comprises three-dimensional printing, more preferably three-dimensional inkjet printing. In these embodiments a building material is dispensed from a dispensing head having a circuit for controllably dispensing building material in layers on a supporting structure. Typically, each dispensing head optionally and preferably has a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in additive manufacturing and which is able to form a three-dimensional object on its own, i.e., without having to be mixed or combined with any other substance.

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing two or more different modeling materials, each material from a different dispensing head of the AM. The materials are optionally and preferably deposited in layers during the same pass of the dispensing heads. The materials and combination of materials within the layer are selected according to the desired properties of the object.

Figure 5A:
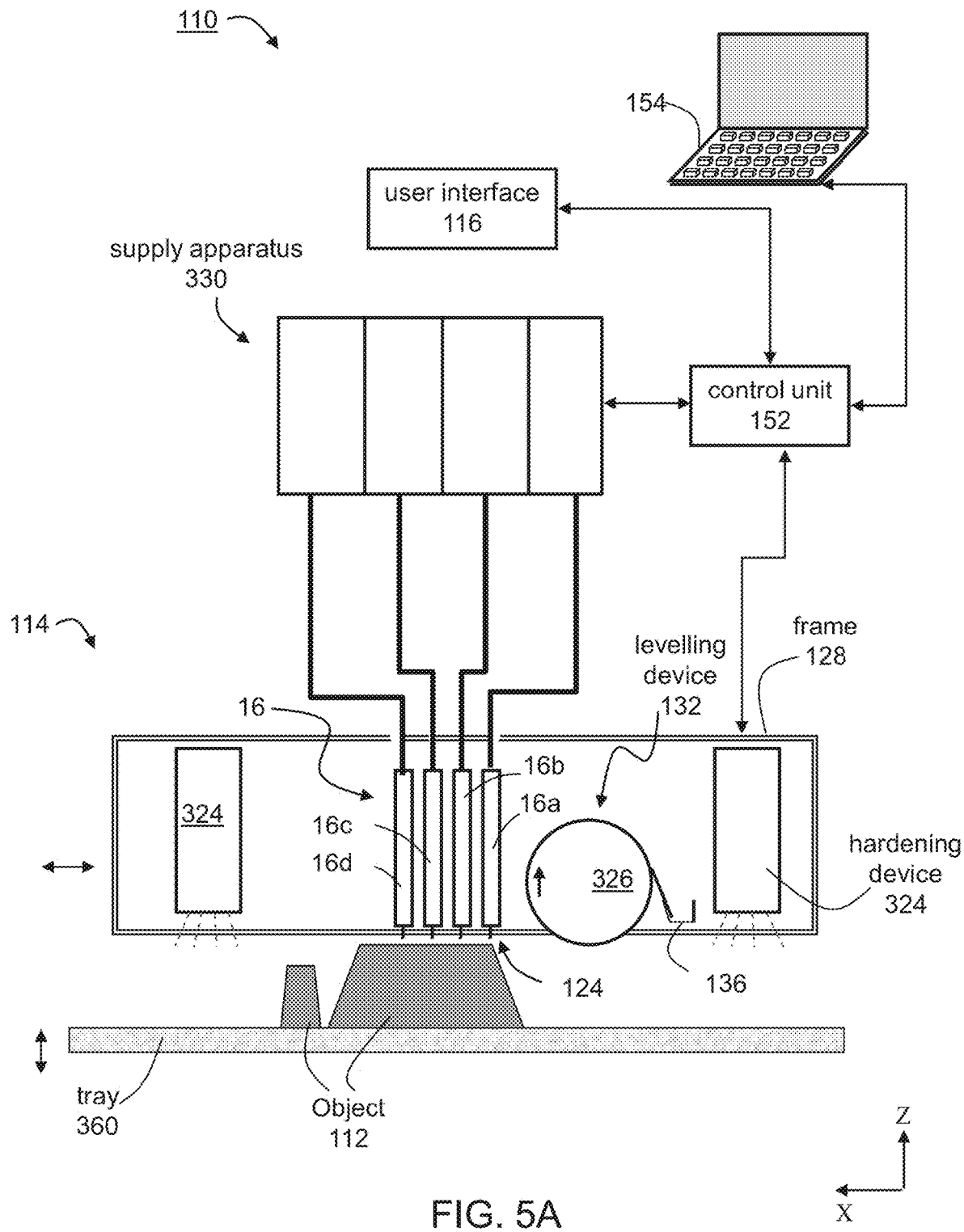
FIGS. 5A-5D are schematic illustrations of an additive manufacturing system according to some embodiments of the invention.

A representative and non-limiting example of a system 110 suitable for AM of an object 112 according to some embodiments of the present invention is illustrated in FIG. 5A. System 110 comprises an additive manufacturing apparatus 114 having a dispensing unit 16 which comprises a plurality of dispensing heads. Each head preferably comprises an array of one or more nozzles 122, as illustrated in FIGS. 6A-6C described below, through which a liquid building material 124 is dispensed.

Preferably, but not obligatorily, apparatus 114 is a three-dimensional printing apparatus, in which case the dispensing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature control unit (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 5A, four dispensing heads 16a, 16b, 16c and 16d are illustrated. Each of heads 16a, 16b, 16c and 16d has a nozzle array. In this Example, heads 16a and 16b can be designated for modeling material/s and heads 16c and 16d can be designated for support material. Thus, head 16a can dispense a first modeling material, head 16b can dispense a second modeling material and heads 16c and 16d can both dispense support material. In an alternative embodiment, heads 16c and 16d, for example, may be combined in a single head having two nozzle arrays for depositing support material.

Yet it is to be understood that it is not intended to limit the scope of the present invention and that the number of modeling material depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

As used herein throughout, the term "about" refers to ±10% or to ±5%.

For example, for a=1, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a hardening device 324 which can include any device configured to emit light, heat or the like that may cause the deposited material to hardened. For example, hardening device 324 can comprise one or more radiation sources, which can be, for example, an ultraviolet or visible or infrared lamp, or other sources of electromagnetic radiation, or electron beam source, depending on the modeling material being used. In some embodiments of the present invention, hardening device 324 serves for curing or solidifying the modeling material.

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the materials just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward.

In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A control unit 340 controls fabrication apparatus 114 and optionally and preferably also supply system 330. Control unit 340 typically includes an electronic circuit configured to perform the controlling operations. Control unit 340 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 340 controls the voltage applied to each dispensing head or nozzle array and the temperature of the building material in the respective printing head.

Once the manufacturing data is loaded to control unit 340 it can operate without user intervention. In some embodiments, control unit 340 receives additional input from the operator, e.g., using data processor 154 or using a user interface 116 communicating with unit 340. User interface 116 can be of any type known in the art, such as, but not limited to, a keyboard, a touch screen and the like. For example, control unit 340 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 5B:
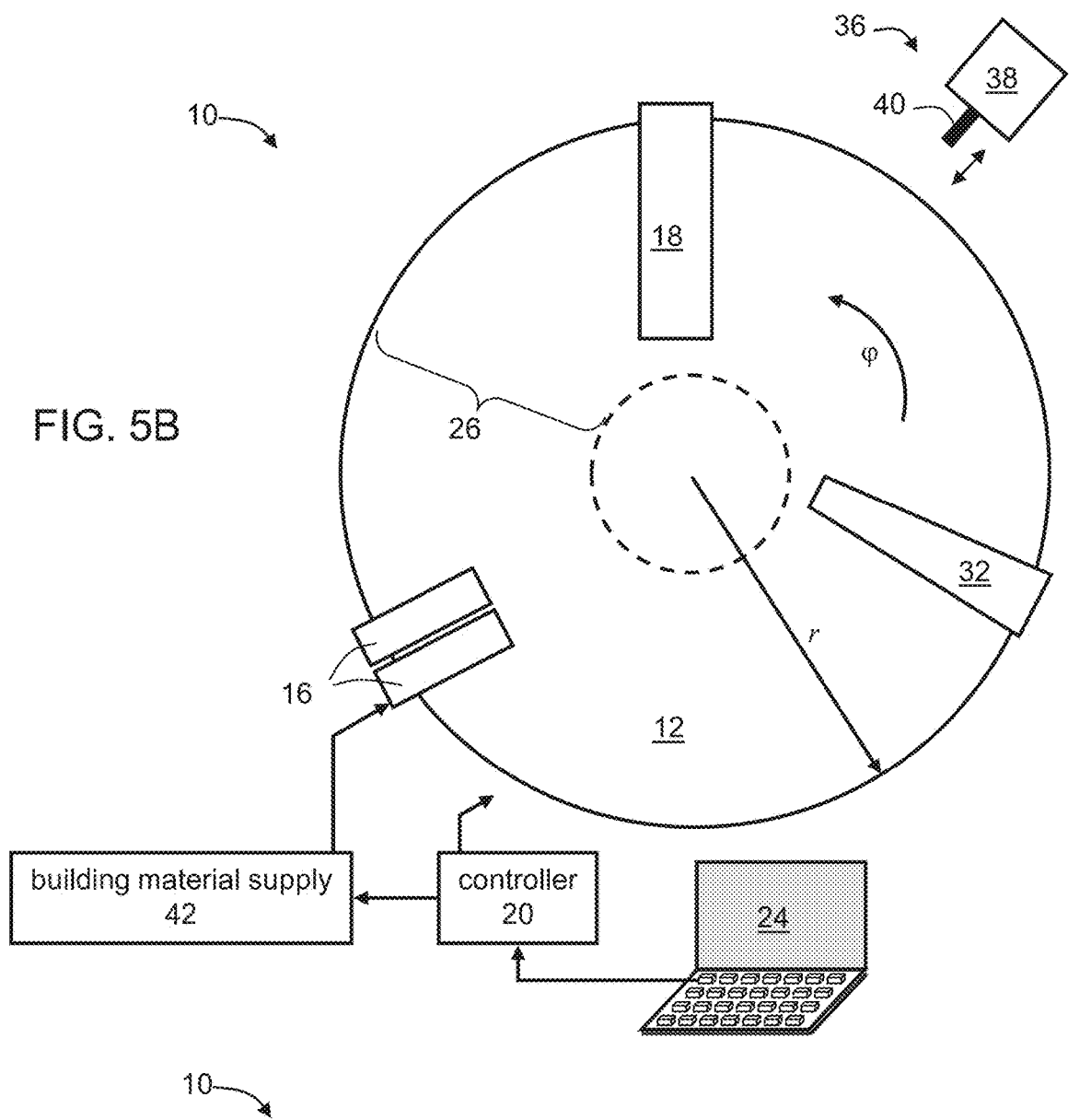
Figure 5C:
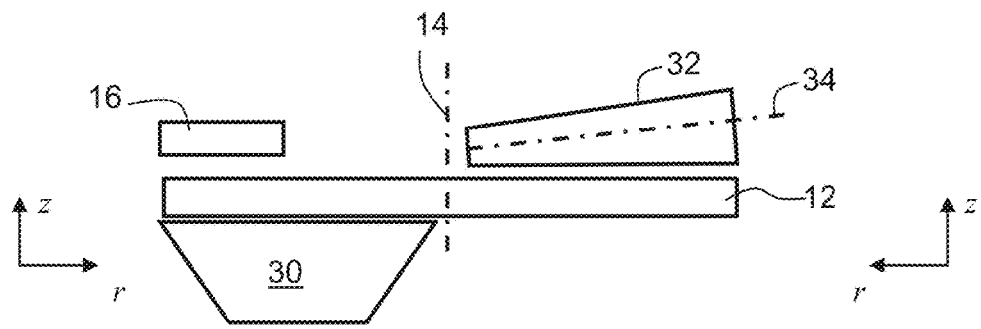
Figure 5D:
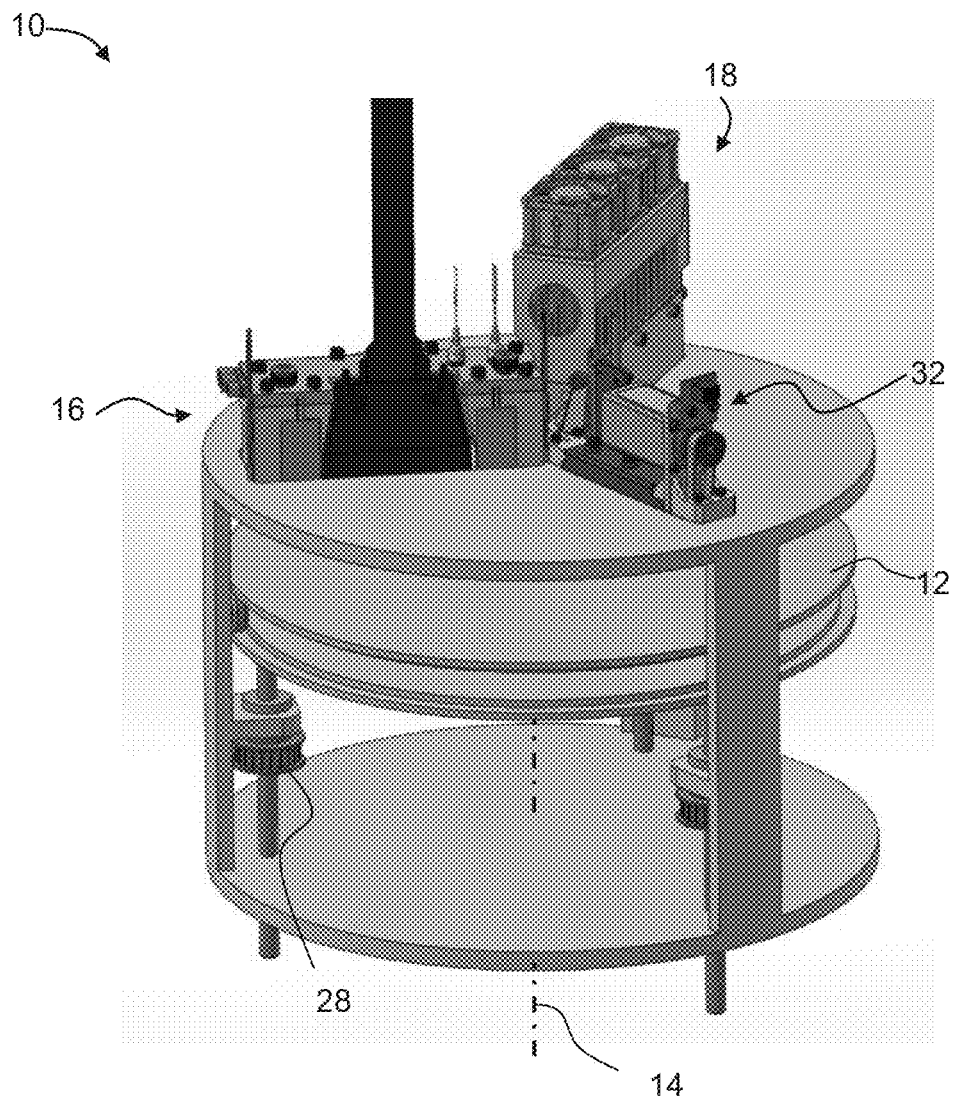

Another representative and non-limiting example of a system 10 suitable for AM of an object according to some embodiments of the present invention is illustrated in FIGS. 5B-5D. FIGS. 5B-5D illustrate a top view (FIG. 5B), a side view (FIG. 5C) and an isometric view (FIG. 5D) of system 10.

In the present embodiments, system 10 comprises a tray 12 and a plurality of inkjet printing heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 5B tray replacement device 36 is illustrated as a drive 38 with a movable arm 40 configured to pull tray 12, but other types of tray replacement devices are also contemplated.

Exemplified embodiments for the printing head 16 are illustrated in FIGS. 6A-6C. These embodiments can be employed for any of the AM systems described above, including, without limitation, system 110 and system 10.

FIGS. 6A-6B illustrate a printing head 16 with one (FIG. 6A) and two (FIG. 6B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 6C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can has an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material at different radial positions.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 6C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1 R_2 = (R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray 12 along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different materials from different dispensing heads. These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Published Application No. 20100191360, and International Publication No. WO2016/009426, the contents of which are hereby incorporated by reference.

Figure 7:
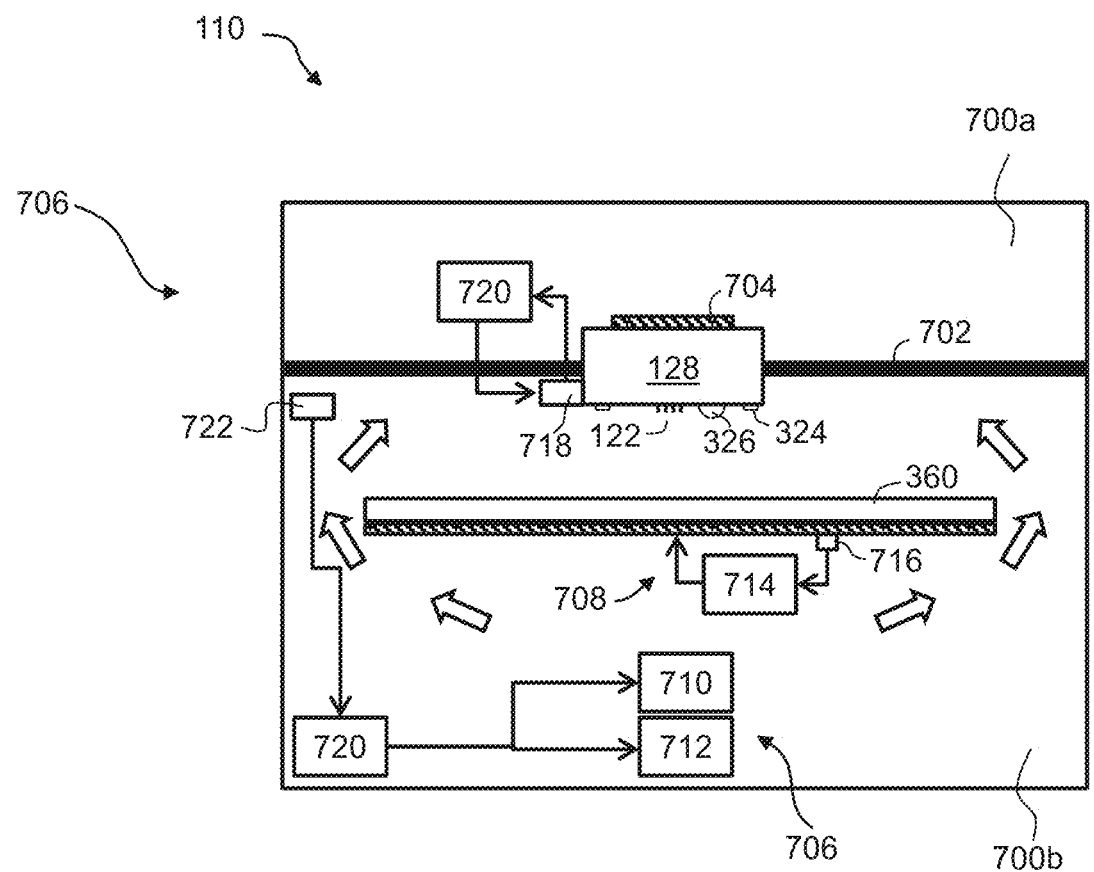
FIG. 7 is a schematic illustration of an additive manufacturing system in embodiments of the invention in which the system comprises a thermal screen.

The systems of the present embodiments (system 10 and system 110) are optionally and preferably supplemented with a thermal screen for thermally separating the circuits of the dispensing or printing heads from the space between the heads and the tray. A representative schematic illustration of this embodiment is shown in FIG. 7. FIG. 7 illustrates the system for the case of linear relative motion between the tray and the heads, but the ordinarily skilled person, provided with the details described herein, would know how to adjust the drawing for the case in which the relative motion is rotary (for example, by replacing tray 360 of with tray 12, and printing block 128 by at least one of printing head 16, radiation source 18 and leveling device 32). For clarity of presentation, several features of the systems such as the supply apparatus, the user interface and the controller have been omitted from FIG. 7.

Shown in FIG. 7 is a printing chamber 700 having therein the tray 360 and the printing block 128. Block 128 represents all the elements that are used for dispensing and hardening the building materials, including, without limitation, the printing heads, leveling devices and hardening devices. The electronic circuits of block 128 (e.g., the electronic circuit of the printing heads, leveling devices and/or hardening devices) are located at the upper part of block 128 and are collectively shown at 704. The lower part of block 128 can include the nozzles 122 of the printing heads, the mechanical parts of leveling device 326 and the output of the hardening device 324).

A thermal screen 702 separates between the upper part 700a and lower part 700b of chamber 700, such that the upper part of block 128, including electronic circuits 704, is above thermal screen 702, and the lower part of block 128 is below thermal screen 702. This ensures that the electronic circuits 704 are thermally separated from the components of block 128 that dispense or otherwise interact (mechanically or by way of radiation) with the building material. This embodiment is useful when the system is used to dispense the first and/or second modeling formulations described herein, particularly when heat is applied to the formulations, for example, for reducing the curling effect.

Thermal screen 72 is optionally and preferably collapsible and expandable, and is positioned to simultaneously fold at one side of block 128 and expand at an opposite side of block 128 during the motion of block 128. For example, screen 702 can be structured as an accordion folding screen or as a telescopic screen, e.g., a concentric coupling of a series of nested and axially interlocking hollow structures of gradually reducing dimensions. Screen 702 can be made of, or coated by, a thermally reflective material.

In some embodiments of the present invention system 110 (or system 10) comprises a heating system 706 that heats the lower part 700b of chamber 700, particularly the space between the printing head and the tray. Heating system 706 can be embodied in more than one way. In some embodiments of the present invention, heating system 706 comprises a tray heater 708 in thermal contact with a back side of tray 360 for delivering heat to the modeling material that is dispensed on the front side of the tray by heat conduction.

Tray heater 708 can comprises one or more heating panels having resistance filament. When tray heater 708 is employed, tray 360 is made of a heat conductive material, such as a metal, e.g., aluminum. Typically, but not necessarily, the resistance filament can be coated by or embedded in an encapsulation, such as, but not limited to, a silicon encapsulation or the like. The heating panel(s) are preferably disposed so as to cover the entire back side of the working area of tray 360. The temperature of heater 708 can be controlled by a temperature control circuit 714, such as, but not limited to, a proportional-integral-derivative (PID) controller. Temperature control circuit 714 can receive temperature data from a temperature sensor 716, such as, but not limited to, a thermocouple, positioned in contact with heater 708 and control the voltage on the resistance filament responsively to the received temperature data and to control signals received from the main controller (not shown, see 152 in FIG. 5A and 20 in FIG. 5B).

Typical operational parameters of tray heater 708 are, without limitation, temperature range of 40-100° C., maximal flux about 1-2 w/cm$^2$, e.g., about 1.5 w/cm$^2$, maximal applied voltage about 360-400 volts, e.g., about 380 volts, or from about 150 volts to about 230 volts.

In some embodiments of the present invention heating system 706 comprises a radiation source 718 that delivers heat to said dispensed modeling material by radiation (e.g., infrared radiation). Radiative heat is optionally and preferably applied from the top side of the tray so as to allow heating dispensed material that is farther from the tray. For example, source 718 can be mounted on block 128 (e.g., alongside device 324), so as to allow it to move reciprocally over the tray. The radiation source 718 can be controlled by a temperature control circuit 720, such as, but not limited to, a (PID) controller, which receives temperature data from a temperature sensor (not shown) that is mounted on the source 718, and provides voltage pulses to the source responsively to the received temperature data and to control signals received from the main controller (not shown, see 152 in FIG. 5A and 20 in FIG. 5B). Alternatively, an open loop control can be employed, in which case a constant voltage level is applied to the source without dynamically controlling the voltage based on temperature data.

Figure 8:
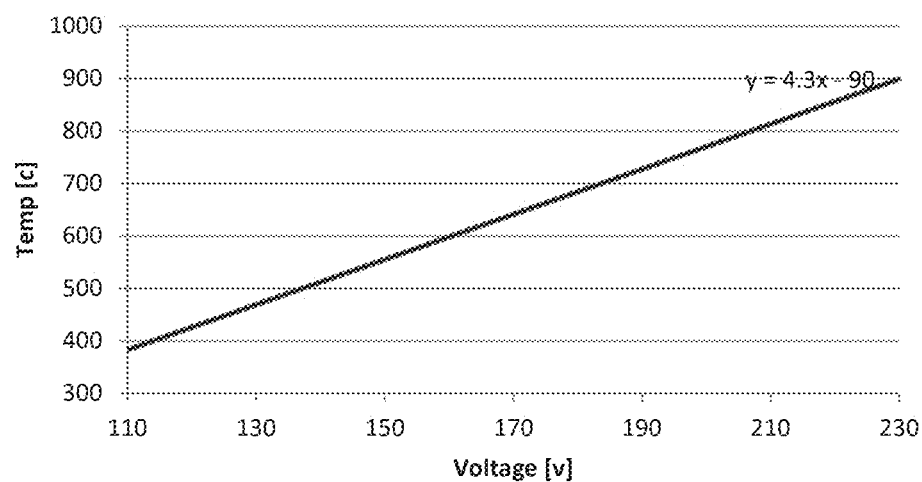
FIG. 8 is a graph showing a typical linear dependence of a temperature on voltage applied to an infrared source.

Typical operational parameters of infrared source 718 are, without limitation, temp range of 40-900° C., wavelength range 2-10 μm, maximal flux 6-7 w/cm$^2$, e.g., about 6.4 w/cm$^2$, voltage 150-400 volts, e.g., about 180 volts. FIG. 8 is a graph showing a typical linear dependence of the temperature inside infrared source 718 as a function of the voltage applied to source 718.

In some embodiments of the present invention, heating system 706 comprises a chamber heater 712 for delivering heat to the modeling material that is dispensed on the front side of the tray by heat conduction. In some embodiments of the present invention, heating system 706 comprises a blower and/or fan 710 positioned outside the space between the block 128 and the tray 360 (e.g., below the tray) for delivering heat to the dispensed modeling material by convection. Heat convection (e.g., by air) is generally shown by block arrows. Use of chamber heater 712 optionally and preferably in combination with blower and/or fan 710 is advantageous because it allows heating also the side walls and the top of the printed object. Preferably, the chamber heater 712 is activated before (e.g., 10-60 minutes before) the dispensing of building material is initiated.

The chamber heater 712 and/or blower and/or fan 710 is or can be controlled by a temperature control circuit 722, such as, but not limited to, a (PID) controller, which receives temperature data from a temperature sensor 724 that is mounted in the space between block 128 and tray 360, and controls the temperature of chamber heater 712 and/or the fan speed of blower or fan 710 responsively to the received temperature data and to control signals received from the main controller (not shown, see 152 in FIG. 5A and 20 in FIG. 5B). The maximal temperature of heater 712 is, without limitation 600-700° C., e.g., about 650° C., and the maximal air flow generated by blower or fan 710 is, without limitation 250-350 l/min, e.g., about 300 l/min.

Preferably, heating system 706 includes two or more of the above elements, so as to allow system 706 to deliver heat by at least two mechanisms selected from the group consisting of heat conduction, heat convection and radiation. In some embodiments of the present invention the controller (not shown, see 152 in FIG. 5A and 20 in FIG. 5B) receives from the user interface a heating mode and operates heating system according to received mode. The mode can be selected from a predetermined list heating modes. For example, in one heating mode, the tray heater, infrared radiation, chamber heater and blower or fan are operated. In another heating mode, the tray heater, infrared radiation and chamber heater are operated, but the blower or fan is not operated. In another heating mode, the tray heater and infrared radiation are operated, but the chamber heater and blower or fan is not operated. In another heating mode, the tray heater, infrared radiation and blower or fan are operated, but the chamber heater is not operated. In another heating mode, the tray heater and chamber heater is operated, but the infrared radiation and blower or fan are not operated. In another heating mode, the tray heater, chamber heater is operated and blower or fan are operated, but the infrared radiation is not operated. Typically, but not necessarily the user interface displays this list of modes to the user and allows the user to select the desired mode.

It is recognized that some modeling materials, particularly UV polymerizable materials, exhibit undesired deformation such as curling during the freeform fabrication of the object. In a search made by the inventors of the present invention for a solution to the problem of curling, it was found that the extent of curling is proportional to the extent of volumetric shrinkage that the material undergoes during the polymerization process and the temperature difference between material HDT and the system's temperature during fabrication. The present inventors found that the curling is particularly noticeable for materials with relatively high volumetric shrinkage and relatively high HDT (e.g., within the range of the polymerization temperature).

The present inventors have devised a layered (e.g., polymeric) object or structure which enjoys thermo-mechanical properties which are improved compared to other objects fabricated via AM.

Generally, the structure according to various exemplary embodiments of the present invention is a shelled structure made of two or more modeling formulations (e.g., UV polymerizable modeling formulations). The structure typically comprises a layered core which is at least partially coated by one or more layered shells such that at least one layer of the core engages the same plane with a layer of at least one of the shells. The thickness of each shell, as measured perpendicularly to the surface of the structure, is typically at least 10 µm. In various exemplary embodiments of the invention, the core and the shell are different from each other in their thermo-mechanical properties. This is readily achieved by fabricating the core and shell from different modeling formulations or different combinations of modeling formulations. The thermo-mechanical properties of the core and shell are referred to herein as "core thermo-mechanical properties" and "shell thermo-mechanical properties," respectively.

A representative and non-limiting example of a structure according to some embodiments of the present invention is shown in FIGS. 9A-9D.

Figure 9A:
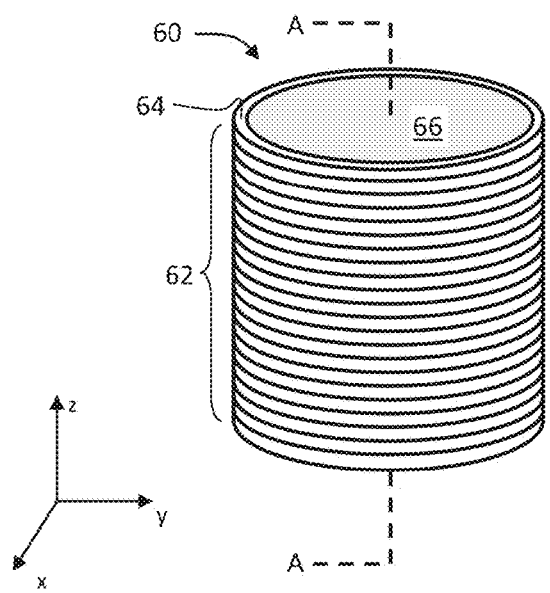
FIGS. 9A-9F are schematic illustrations of shelled structures, according to some embodiments of the present invention.
Figure 9B:
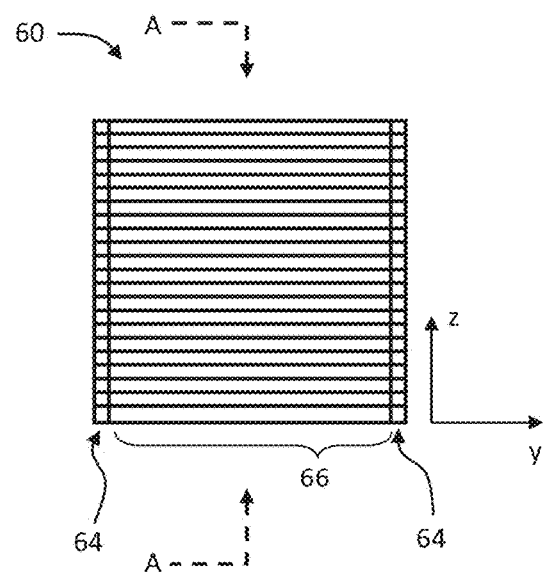

FIG. 9A is a schematic illustration of a perspective view of a structure 60, and FIG. 9B is a cross-sectional view of structure 60 along line A-A of FIG. 9A. For clarity of presentation a Cartesian coordinate system is also illustrated.

Structure 60 comprises a plurality of layers 62 stacked along the z direction. Structure 60 is typically fabricated by an AM technique, e.g., using system 10, whereby the layers are formed in a sequential manner. Thus, the z direction is also referred to herein as the "build direction" of the structure. Layers 62 are, therefore, perpendicular to the build direction. Although structure 60 is shown as a cylinder, this need not necessarily be the case, since the structure of the present embodiments can have any shape.

The shell and core of structure 60 are shown at 64 and 66, respectively. As shown, the layers of core 66 and the layers of shell 64 are co-planar. The AM technique allows the simultaneous fabrication of shell 64 and core 66, whereby for a particular formed layer, the inner part of the layer constitutes a layer of the core, and the periphery of the layer, or part thereof, constitutes a layer of the shell.

Figure 9C:
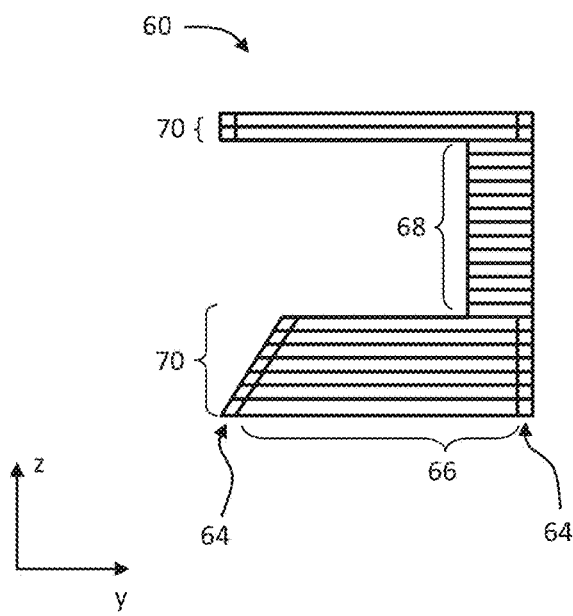
Figure 11:
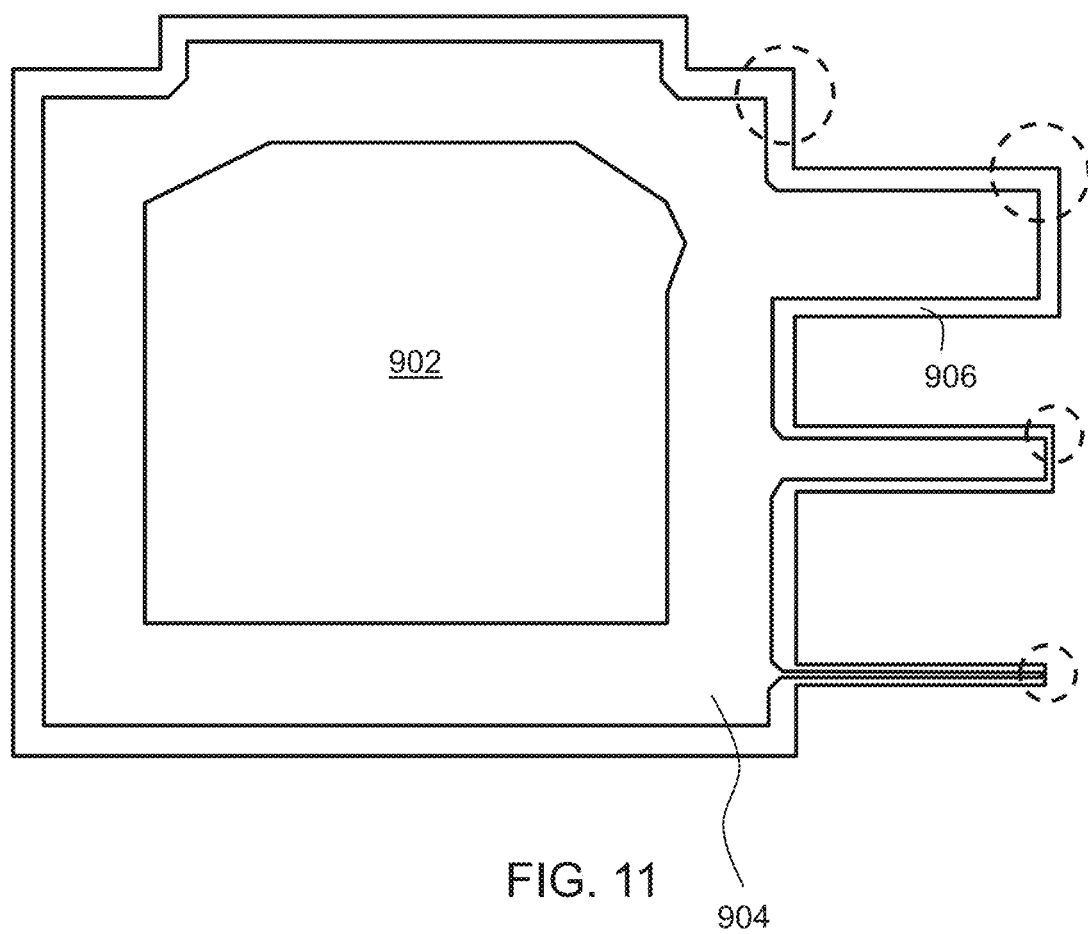
FIG. 11 is a schematic illustration of a shelled structure having parts that are devoid of a core region, according to some embodiments of the present invention.

A peripheral section of a layer which contributes to shell 64 is referred to herein as an "envelope region" of the layer. In the non-limiting example of FIGS. 9A and 9B, each of layers 62 has an envelope region. Namely, each layer in FIGS. 9A and 9B contributes both to the core and to the shell. However, this need not necessarily be the case, since, for some applications, it may be desired to have the core exposed to the environment in some regions. In these applications, at least some of the layers do not include an envelope region. A representative example of such configuration is illustrated in the cross-sectional view of FIG. 9C, showing some layers 68 which contribute to the core but not to the shell, and some layers 70 which contribute to both the core and the shell. In some embodiments, one or more layers do not include a region with core thermo-mechanical properties and comprise only a region with shell thermo-mechanical properties. These embodiments are particularly useful when the structure has one or more thin parts, wherein the layers forming those parts of the structure are preferably devoid of a core region. A representative example of such a structure is illustrated in FIG. 11, described below. Also contemplated are embodiments in which one or more layers do not include a region with shell thermo-mechanical properties and comprise only a region with core thermo-mechanical properties.

Figure 9D:
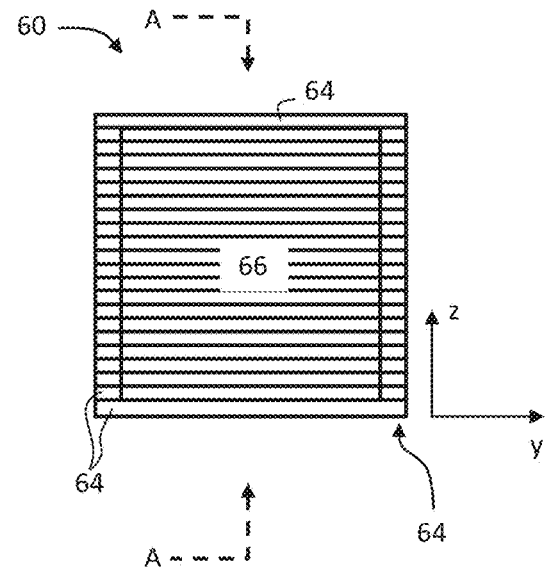

The shell can, optionally and preferably, also cover structure 60 from above and/or below, relative to the z direction. In these embodiments, some layers at the top most and/or bottom most parts of structure 60 have at least one material property which is different from core 66. In various exemplary embodiments of the invention the top most and/or bottom most parts of structure 60 have the same material property as shell 64. A representative example of this embodiment is illustrated in FIG. 9D. The top/bottom shell of structure 60 may be thinner (e.g., 2 times thinner) than the side shell, e.g. when the top or bottom shell comprises a layer above or below the structure, and therefore has the same thickness as required for layers forming the object.

Figure 9E:
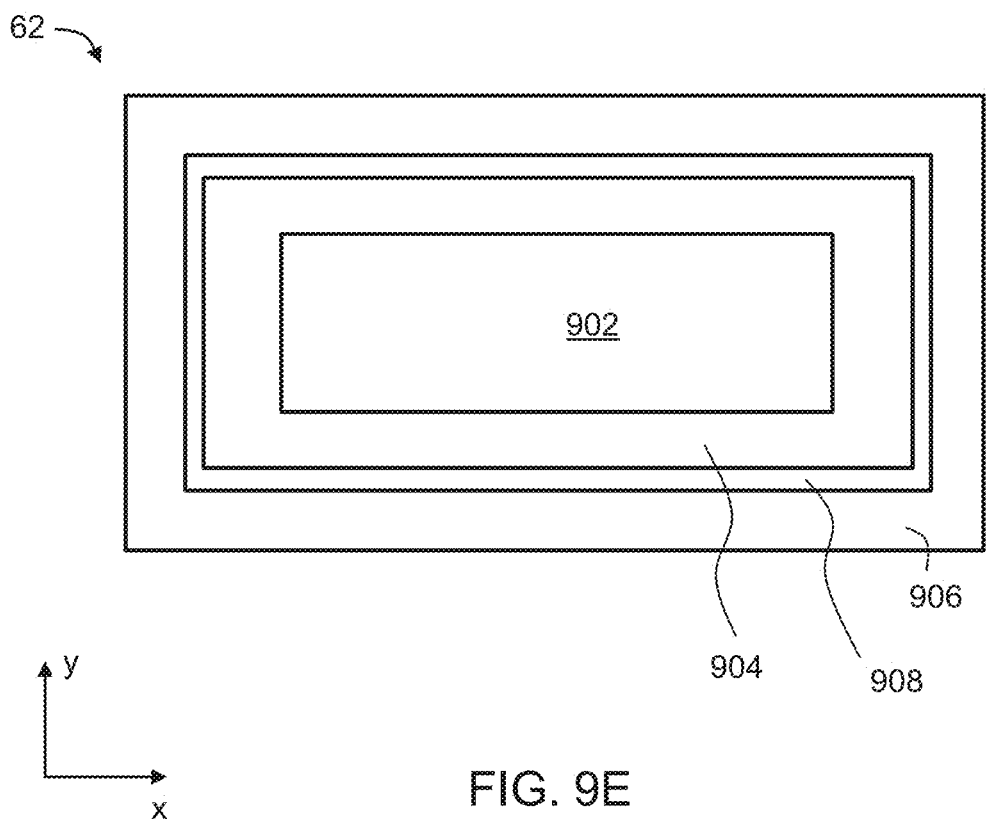

A representative example of a layer 62 suitable for some embodiments of the present invention is illustrated in FIG. 9E. In the schematic illustration of FIG. 9E, which is not to be considered as limiting, layer 62 has a core region 902, an inner envelope region 904, at least partially, more preferably completely, surrounding core region 902, and an outer envelope region 906, at least partially, more preferably completely, surrounding inner envelope region 904. Preferably, but not necessarily, outer envelope region 906 is the outermost region of layer 62.

Core region 902 preferably comprises a combination of at least two modeling formulations. The combination is optionally and preferably embodied in a voxelated manner wherein some voxels that form region 902 are made of one of the modeling martial formulations, other voxels are made of another one of the modeling martial formulations, and so on. In various exemplary embodiments of the invention core region 902 is made of a voxelated combination between the first modeling formulation and the second modeling formulation described below. The voxelated combination can be according to any distribution by which voxels occupied by the first formulation are interlaced within voxels occupied by the second formulation, such as, but not limited to, a random distribution.

The ratio between the number of voxels within region 902 that are occupied by the first modeling formulation and the number of voxels within region 902 that are occupied by the second modeling formulation is preferably from about 0.25 to about 0.45, or from about 0.25 to about 0.4, or from about 0.3 to about 0.4, e.g., about 0.33. In any embodiment of the invention, including any embodiment that includes these ratios, region 902 is optionally and preferably devoid of any material other than the first formulation and the second formulation described herein.

Further embodiments related to the ratio between the first modeling material formulation and the second modeling material formulation are provided hereinunder.

Inner envelope region 904 is preferably made of a single modeling formulation, for example, the first modeling formulation described below. Outer envelope region 906 is preferably made of a single modeling formulation, for example, the second modeling formulation described below.

The thickness of region 904, as measured within the plane of layer 62 and perpendicularly to the surface of structure 60, is preferably from about 0.1 mm to about 4 mm, or from about 0.1 mm to about 3.5 mm, or from about 0.1 mm to about 3 mm, or from about 0.1 mm to about 2.5 mm, or from about 0.1 mm to about 2 mm, or from about 0.2 mm to about 1.5 mm, or from about 0.3 mm to about 1.5 mm, or from about 0.4 mm to about 1.5 mm, or from about 0.4 mm to about 1.4 mm or from about 0.4 mm to about 1.3 mm or from about 0.4 mm to about 1.2 mm or from about 0.4 mm to about 1.1 mm. The thickness of region 906, as measured within the plane of layer 62 and perpendicularly to the surface of structure 60, is preferably from about from about 150 microns to about 600 microns, or from about from about 150 microns to about 550 microns, or from about from about 150 microns to about 500 microns, or from about from about 150 microns to about 450 microns, or from about from about 150 microns to about 400 microns, or from about from about 150 microns to about 350 microns or from about 180 microns to about 320 microns or from about 200 microns to about 300 microns or from about 220 microns to about 280 microns or from about 240 microns to about 260 microns.

In some embodiments of the present invention, layer 62 comprises an additional envelope region 908 between inner envelope region 904 and outer envelope region 906. Region 904 is preferably made of a combination, e.g., voxelated combination, of two or more modeling formulations. Typically, but not exclusively, region 904 is made of a voxelated combination including the modeling formulation making region 904 (the first modeling formulation in the above example) and the modeling formulation making region 906 (the second modeling formulation in the above example). It was found by the Inventors of the present invention that such configuration allows region 908 to serve as a stitching region that bonds region 906 to region 904.

The ratio between the number of voxels within region 908 that are occupied by the first modeling formulation and the number of voxels within region 902 that are occupied by the second modeling formulation is preferably from about 0.9 to about 1.1, e.g., about 1. In any embodiment of the invention, including any embodiment that includes these ratios, region 908 is optionally and preferably devoid of any material other than the first formulation and the second formulation described herein. The thickness of region 908, as measured within the plane of layer 62 and perpendicularly to the surface of structure 60, is preferably less than the thickness of region 904 and also less than the thickness of region 906. For example, the thickness of region 908 can be from about 70 microns to about 100 microns or from about 75 microns to about 95 microns or from about 80 microns to about 90 microns.

In some embodiments, one or more layers do not include a core region and comprise only envelope regions. These embodiments are particularly useful when the structure has one or more thin parts, wherein the layers forming those parts of the structure are preferably devoid of a core region. A representative example of such a structure is illustrated in FIG. 11, in which regions marked by dashed circles are devoid of core 902.

Figure 9F:
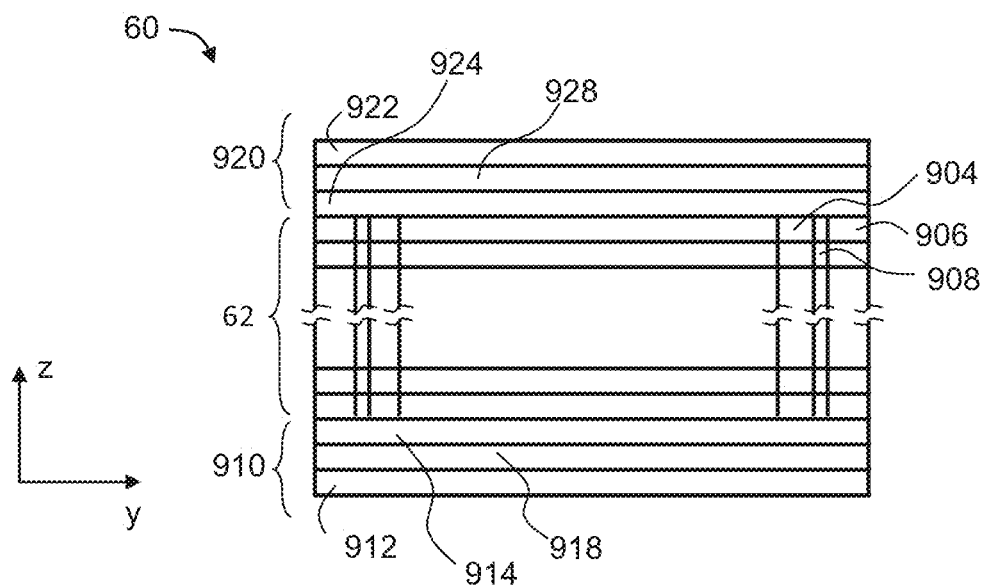

FIG. 9F is a schematic illustration of a side view of structure 60 in embodiments of the invention in which at least some of the layers 62 of structure 60 comprise core region 902, envelope regions 904 and 906 and optionally also an additional envelope region 908 between regions 904 and 906. In these embodiments structure 60 optionally and preferably comprises a base section 910 and/or a top section 920, each optionally and preferably comprises a plurality of layers.

The layers of sections 910 and 920 can be arranged such that one or more of the topmost layers 922 of top section 920 and one or more of the bottommost layers 912 of base section 910 are made of the same formulation at envelope region 906 described above. Alternatively, or more preferably additionally, the layers of sections 910 and 920 can be arranged such that one or more of the bottommost layers 924 of top section 920 and one or more of the topmost layers 914 of base section 910 are made of the same formulation at envelope region 904 described above. In some embodiments of the present invention at least one of base section 910 and top section 920 comprises one or more intermediate layers (respectively shown at 918, 928) that is made of the same or similar combination of formulations as region 908 described above.

For clarity of presentation, FIG. 9F shows a single layer for each of layers 912, 914, 918, 922, 924 and 928, however, this need not necessarily be the case, since, for some applications, at least one of these layers is embodied as a stack of layers. The number of layers in each stack is preferably selected such that the thickness, along the build direction (the z direction, in the present illustration) of the stack is a proximately the same as the thickness of the respective envelope region. Specifically, the number of layers in stacks 912 and 922 is preferably selected such that the overall thickness of these stacks along the build direction is approximately the same (e.g., within 10%) as the thickness of outer envelope region 906 as measured in the plane of layer 62 and perpendicularly to the surface of structure 60, the number of layers in stacks 914 and 924 is preferably selected such that the overall thickness of these stacks along the build direction is approximately the same (e.g., within 10%) as the thickness of inner envelope region 904 as measured in the plane of layer 62 and perpendicularly to the surface of structure 60, and the number of layers in stacks 918 and 928 is preferably selected such that the overall thickness of these stacks along the build direction is approximately the same (e.g., within 10%) as the thickness of additional envelope region 908 as measured in the plane of layer 62 and perpendicularly to the surface of structure 60.

The present embodiments thus provide a method of layerwise fabrication of a three-dimensional object, in which for each of at least a few (e.g., at least two or at least three or at least 10 or at least 20 or at least 40 or at least 80) of the layers or all the layers, two or more modeling formulations are dispensed, optionally and preferably using system 10 or system 110, to form a core region and at least one envelope region at least partially surrounding core region. Each modeling formulation is preferably dispensed by jetting it out of a plurality of nozzles of a print head (e.g., print head 16). The dispensing is optionally and preferably in a voxelated manner.

The core region is optionally and preferably formed from a first modeling formulation as well as a second modeling formulation, as described herein in any of the respective embodiments. This is optionally and preferably, but not necessarily, achieved by interlacing voxels of the first modeling formulation and voxels of the second modeling formulation within the core according to a predetermined voxel ratio. In some embodiments of the present invention the amount of the first modeling formulation is the core region is higher than 25% or higher than 26% or higher than 27% or higher than 28% or higher than 29% or higher than 30% of a total weight of core region. In some embodiments of the present invention the ratio between the weight of the first modeling formulation in the core region and the weight of the second modeling formulation in the core region is from about 0.1 to about 10, or from about 0.2 to about 5, or from about 0.2 to about 2, or from about 0.2 to about 1, or from about 0.2 to about 0.5, or from about 1 to about 10, or from about 2 to about 10, or from about 5 to about 10.

Preferably, the two modeling formulations forming the core region are selected such that the core region, when hardened, is characterized by HDT of at least 60° C.

As used herein, HDT refers to a temperature at which the respective formulation or combination of formulations deforms under a predetermined load at some certain temperature. Suitable test procedures for determining the HDT of a formulation or combination of formulations are the ASTM D-648 series, particularly the ASTM D-648-06 and ASTM D-648-07 methods. In various exemplary embodiments of the invention the core and shell of the structure differ in their HDT as measured by the ASTM D-648-06 method as well as their HDT as measured by the ASTM D-648-07 method. In some embodiments of the present invention the core and shell of the structure differ in their HDT as measured by any method of the ASTM D-648 series. In the majority of the examples herein, HDT at a pressure of 0.45 MPa was used.

One or more of the envelope regions are optionally and preferably formed from one of the formulations, and preferably not from the other formulation. For example, an envelope region can be formed from the first modeling formulation but not the second modeling formulation, or be formed from the second modeling formulation but not the first modeling formulation.

Once formed, the layer including the two modeling formulations is preferably exposed to a curing condition (e.g., curing energy) so as to harden the formulations. This is optionally and preferably executed using hardening device 324 or radiation source 18. Alternatively, a curing condition can be exposure to the environment and/or to a chemical reagent.

In some of any of the embodiments described herein, the building material further comprises a support material.

In some of any of the embodiments described herein, dispensing a building material formulation (uncured building material) further comprises dispensing support material formulation(s) which form the support material upon application of curing energy.

Dispensing the support material formulation, in some embodiments, is effected by inkjet printing head(s) other than the inkjet printing heads used for dispensing the first and second (and other) compositions forming the modeling material.

In some embodiments, exposing the dispensed building material to a curing condition (e.g., curing energy) includes applying a curing condition (e.g., curing energy) that affects curing of a support material formulation, to thereby obtain a cured support material.

In some of any of the embodiments described herein, once a building material is cured, the method further comprises removing the cured support material. Any of the methods usable for removing a support material can be used, depending on the materials forming the modeling material and the support material. Such methods include, for example, mechanical removal of the cured support material and/or chemical removal of the cured support material by contacting the cured support material with a solution in which it is dissolvable (e.g., an alkaline aqueous solution).

As used herein, the term "curing" describes a process in which a formulation is hardened or solidifies, and is also referred to herein as "hardening". This term encompasses polymerization of monomer(s) and/or oligomer(s) and/or cross-linking of polymeric chains (either of a polymer present before curing or of a polymeric material formed in a polymerization of the monomers or oligomers). This term alternatively encompasses solidification of the formulation that does not involve polymerization and/or cross-linking.

The product of a curing reaction is typically a polymeric material and in some cases a cross-linked polymeric material. This term, as used herein, encompasses also partial curing, for example, curing of at least 20% or at least 30% or at least 40% or at least 50% or at least 60% or at least 70% of the formulation, as well as 100% of the formulation.

A "curing energy" typically includes application of radiation or application of heat, as described herein.

A curable material or system that undergoes curing upon exposure to electromagnetic radiation is referred to herein interchangeably as "photopolymerizable" or "photoactivatable" or "photocurable".

When the curing energy comprises heat, the curing is also referred to herein and in the art as "thermal curing" and comprises application of thermal energy. Applying thermal energy can be effected, for example, by heating a receiving medium onto which the layers are dispensed or a chamber hosting the receiving medium, as described herein. In some embodiments, the heating is effected using a resistive heater.

In some embodiments, the heating is effected by irradiating the dispensed layers by heat-inducing radiation. Such irradiation can be effected, for example, by means of an IR lamp or Xenon lamp, operated to emit radiation onto the deposited layer.

In some of any of the embodiments described herein, the method further comprises exposing the cured or solidified modeling material, either before or after removal of a support material formulation, if such has been included in the building material, to a post-treatment condition. The post-treatment condition is typically aimed at further hardening the cured modeling material. In some embodiments, the post-treatment hardens a partially-cured material to thereby obtain a completely cured material.

In some embodiments, the post-treatment is effected by exposure to heat or radiation, as described in any of the respective embodiments herein. In some embodiments, when the condition is heat, the post-treatment can be effected for a time period that ranges from a few minutes (e.g., 10 minutes) to a few hours (e.g., 1-24 hours).

The term "post-treatment" is also referred to herein interchangeably as "post-curing treatment" or simply as "post-curing", or as "post-hardening treatment".

In some embodiments of the present invention there are two or more envelope regions surrounding or partially surrounding the core. For example, the core can be surrounded by an inner envelope region, and the inner envelope region can be surrounded by an outer envelope region. Preferably, but not necessarily, the lateral thickness of the inner envelope region is from about 1 to about 5 microns, and the lateral thickness of the outer envelope region a few (e.g., from about 2 to about 10) voxels. The lateral thickness of an envelope region is a thickness that is measured within the layer, namely along a direction that is perpendicular to the built direction.

In some embodiments of the present invention the layers are exposed to heat, during the dispensing of the formulation and/or during the exposure to curing energy. This can be executed using heating system 706. The heating is preferably to a temperature which is below the HDT of the first modeling formulation, for example, at least 10° C. below the HDT of the first formulation. The heating can be to a temperature which above the HDT of the second modeling formulation. More preferably, the heating is to a temperature which is below (e.g., at least 10° C. below) the HDT of the first modeling formulation and above an HDT of second modeling formulation.

Typical temperatures to which the layer is heated, including, without limitation, at least 40° C., or from about 40° C. to about 60° C.

In some embodiments of the present invention, the layer, once formed and hardened, is subjected to a post hardening treatment. Preferably, the post hardening treatment is a thermal treatment, more preferably heating. In a preferred embodiment, the post curing treatment includes maintaining a temperature of at least 120° C., for a time period of at least 1 hour.

The present embodiments contemplate several types of formulations for each of the first and second modeling formulations that are dispensed to form the layers of the object.

In some embodiments of the present invention the first modeling formulation is characterized, when hardened, by HDT of at least 90° C., in some embodiments of the present invention the second modeling formulation is characterized, when hardened, by Izod impact resistance (IR) value of at least 45 J/m, in some embodiments of the present invention the second modeling formulation is characterized, when hardened, by HDT lower than 50° C., or lower than 45° C., and in some embodiments of the present invention a ratio between elastic moduli of first and second modeling formulations, when hardened, is from about 2.7 to about 2.9.

As used herein, the term "Izod impact resistance" refers to the loss of energy per unit of thickness following an impact force applied to the respective formulation or combination of formulations. Suitable test procedures for determining the Izod impact resistance of a formulation or combination of formulations are the ASTM D-256 series, particularly the ASTM D-256-06 series. In some embodiments of the present invention the core and shell of the structure differ in their Izod impact resistance value as measured by any method of the ASTM D-256-06 series. It is noted that in the standard ASTM methods there is need to machinate a notch. However, in many cases, this process cuts the shell and exposes the core to the notch tip. Therefore, this standard method is less preferred for evaluating the impact resistance of a structure built according to some embodiments of the present invention. Preferred procedures for determining the impact resistance will now be described. These procedures are particularly useful when the AM includes comprises three-dimensional printing.

According to a first procedure, a test specimen is printed with a rectangular patch made of the shelling formulation or combination of formulations. The dimensions of the patch are calculated in such way that after the notch preparation (as required by the standard ASTM procedure) a 0.25 mm layer of the shelling formulation or combination of formulations remains complete.

According to a second procedure, a test specimen is printed with notch instead of cutting the notch after the specimen is printed. The orientation of the specimen on the tray is vertical, for example, in the Z-Y plane (referred to herein as "orientation F").

Before providing a further detailed description of the modeling formulations according to some embodiments of the present invention, attention will be given to the advantages and potential applications offered thereby.

The present inventors have devised a layered manufacturing AM technology that allows building objects with improved thermo-mechanical properties, even when those properties are not possessed by any one of the modeling formulations used for fabricating the object. For example, embodiments of the present invention provide AM structures, more preferably structures manufactured by jetting two modeling formulations via 3D inkjet printing technology, with high temperature resistance as well as high toughness. Embodiments of the present invention also allow fabricating structures with, for example, high temperature resistance as well as low curling.

The present embodiments thus provide objects that are preferably fabricated by AM, more preferably by 3D inkjet printing technology, and that are characterized by HDT of at least 100° C., or at least 130° C., or at least 140° C. The present embodiments can provide objects that are preferably fabricated by AM, more preferably by 3D inkjet printing technology, and that are characterized by Izod notch impact resistance of at least100 J/m or at least110 J/m or at least120 J/m or at least130 J/m. The present embodiments can provide objects that are preferably fabricated by AM, more preferably by 3D inkjet printing technology, and that feature curling of less than 4 mm, or less than 3 mm.

In any of the methods and systems described herein, at least a first modeling material formulation and a second modeling material formulation are utilized.

The present inventors found that the combination of a first modeling material formulation and a second modeling material formulation can be used to provide a desired stiffness and strength. For example, increasing the content of the first formulation in the core can increase the strength and stiffness of the fabricated object without increasing the HDT. The HDT, in turn, can be controlled by varying the thickness of a shell. For example, when the shell is made of the first formulation but not from the second formulation, the HDT can be increased by increasing the lateral thickness of the shell.

According to some of any of the embodiments described herein the first modeling formulation is characterized by, features, or selected such that it features, when hardened, heat deflection temperature (HDT) of at least 90° C.

According to some of any of the embodiments described herein, the second modeling formulation is characterized by, features, or selected such that it features, when hardened, Izod impact resistance (IR) value of at least 45 J/m.

According to some of any of the embodiments described herein the first modeling formulation is characterized by, features, or selected such that it features, when hardened, heat deflection temperature (HDT) of at least 90° C., and the second modeling formulation is characterized by, features, or selected such that it features, when hardened, Izod impact resistance (IR) value of at least 45 J/m.

In some embodiments, the HDT of the first formulation, when hardened, is at least 100° C., or at least 110° C., or at least 120° C., or at least 130° C., or at least 135° C., or at least 140° C., or higher.

In some embodiments, the Impact resistance (Izod impact resistance) of the second formulation is at least 47, or at least 48, or a least 49, or at least 50, or at least 51, or at least 52, or at least 53, or at least 54, or at least 55, J/m, or higher.

In some of any of the embodiments described herein, the second modeling formulation is characterized by, or features, or selected so as to feature, when hardened, by HDT lower than 50° C., or lower than 45° C.

In some embodiments the HDT of the second formulation, when hardened, ranges from 30 to 50° C., or from 35 to 50° C., or from 38 to 50° C., or from 40 to 50° C., or from 40 to 48° C., or from 40 to 45° C., or from 30 to 45° C., or from 35 to 45° C., including any intermediate value and subranges therebetween.

In some of any of the embodiments described herein, the first and second formulations are characterized by, feature, or selected so as to feature, when hardened, a ratio between elastic moduli which is less than 3.

In some embodiments, the ratio ranges from 2.7 to 2.9.

According to some of any of the embodiments described herein, each of the modeling material formulations comprises one or more curable materials.

Herein throughout, a "curable material" or a "solidifiable" is a compound (e.g., monomeric or oligomeric or polymeric compound) which, when exposed to a curing condition (e.g., curing energy), as described herein, solidifies or hardens to form a cured modeling material as defined herein. Curable materials are typically polymerizable materials, which undergo polymerization and/or cross-linking when exposed to suitable energy source.

In some of any of the embodiments described herein, a curable material is a photopolymerizable material, which polymerizes or undergoes cross-linking upon exposure to radiation, as described herein, and in some embodiments the curable material is a UV-curable material, which polymerizes or undergoes cross-linking upon exposure to UV-vis radiation, as described herein.

In some embodiments, a curable material as described herein is a polymerizable material that polymerizes via photo-induced radical polymerization.

In some of any of the embodiments described herein, a curable material can be a monomer, an oligomer or a short-chain polymer, each being polymerizable as described herein.

In some of any of the embodiments described herein, when a curable material is exposed to curing energy (e.g., radiation), it polymerizes by any one, or combination, of chain elongation and cross-linking.

In some of any of the embodiments described herein, a curable material is a monomer or a mixture of monomers which can form a polymeric modeling material upon a polymerization reaction, when exposed to curing energy at which the polymerization reaction occurs. Such curable materials are also referred to herein as monomeric curable materials.

In some of any of the embodiments described herein, a curable material is an oligomer or a mixture of oligomers which can form a polymeric modeling material upon a polymerization reaction, when exposed to curing energy at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to curing energy (e.g., radiation).

A multi-functional curable material comprises two or more, e.g., 2, 3, 4 or more, functional groups that can undergo polymerization when exposed to curing energy. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric moiety, the multi-functional group is an oligomeric multi-functional curable material.

In some embodiments, at least some, or each of, the curable materials in each of the first and second formulations, are (meth)acrylic materials.

Herein throughout, the term "(meth)acrylic" or "(meth) acrylate" and diversions thereof encompasses both acrylic and methacrylic materials.

Acrylic and methacrylic materials encompass materials bearing one or more acrylate, methacrylate, acrylamide and/or methacrylamide group.

Each of the curable materials can independently be a monomer, an oligomer or a polymer (which may undergo, for example, cross-linking, when cured).

Each of the curable materials can independently be a mono-functional, or multi-functional material.

The curable materials included in the first and second formulations described herein may be defined by the properties provided by each material, when hardened. That is, the materials are defined by properties of a material formed upon exposure to curing energy, namely, upon polymerization. These properties (e.g., Tg), are of a polymeric material formed upon curing any of the described curable materials alone.

In some of any of the embodiments described herein, the first modeling formulation comprises:

at least one curable acrylic monomer characterized, when hardened, by Tg of at least 85° C.;

at least one curable methacrylic monomer characterized, when hardened, by Tg of at least 150° C.; and at least one curable (meth)acrylic oligomer, characterized, when hardened, by Tg of at least 50° C.

In some of any of the embodiments described herein, a concentration of the curable methacrylic monomer is at least 35% by weight of the total weight of the first modeling formulation. In some embodiments, a concentration of the curable methacrylic monomer in the first formulation ranges from 35 to 60%, or from 35 to 50%, or from 35 to 40%, by weight, of the total weight of the first modeling formulation, including any intermediate values and subranges therebetween.

In some of any of the embodiments described herein, the curable methacrylic monomer in the first modeling formulation is characterized by a curing rate lower than 4400 mW/minute, or lower than 4000 mW/minute, or lower than 3800, or lower than 3500, or lower than 3000, or lower than 2800 mW/minute, or lower. In some embodiments, the curing rate is determined by Photo DSC measurements, and is defined as the slope of the curve recorded for mW as a function of time, for example, as described in the Examples section that follows.

In some embodiments, the high Tg methacrylate monomer is a difunctional methacrylate, and in some embodiments, it comprises one or more hydrocarbon chain(s) and/or ring(s) of at least 6, or at least 8, carbon atoms. Monofunctional, or other multifunctional methacrylate monomers, featuring such high-carbon chains and/or rings are also contemplated.

A non-limiting, exemplary methacrylic monomer which is characterized, when hardened, by Tg higher than 150° C., and/or by a curing rate as described herein, is SR 843 (Tricyclodecanedimethanol dimethacrylate (TCDDMDMA)). An additional exemplary such material is sold under the brand name SR-423D. See, for example Table 1.

In some embodiments, acrylic monomers characterized, when hardened, by Tg higher than 85° C. include monofunctional, difunctional, other multifunctional acrylate monomers, and any mixture thereof. In some embodiments, the Tg of the acrylate monomers ranges from 86 to about 300° C.

The acrylate monomers featuring such Tg can be, for example, commonly used monofunctional acrylate monomers such as ACMO and IBOA; multifunctional acrylate monomers such as, for example, Tris (2-hydroxyethyl) isocyanurate triacrylate (THEICTA), commercially available under the name SE368; short-chain alkylene glycol-containing (ethoxylated) difunctional and trifunctional acrylate monomers such as, for example, DPGDA (commercially available under the name SR508), ethoxylated 3 trimethylolpropane triacrylate (TMP3EOTA), commercially available under the name SR454, and long-chain or high-carbon ring multifunctional acrylate monomers such as, for example, Tricyclodecanedimethanol diacrylate (TCDDMDA), commercially available under the name SR833S.

Exemplary acrylic monomers characterized, when hardened, by Tg higher than 85° C. include, but are not limited to, those presented in Table 1 hereinbelow. Any other acrylic monomer featuring the indicated Tg is contemplated. Those skilled in the art would readily recognize additional acrylate monomers featuring Tg higher than 85° C.

The acrylic monomer featuring the indicated Tg, when hardened, can be a mixture of two or more such monomers.

In some embodiments, a concentration of each of the curable acrylic monomers in the first formulation ranges from 5 to 40% by weight of the total weight of the first modeling formulation, including any intermediate values and subranges therebetween. In some embodiments, when two or more such acrylic monomers are present in the formulation, the total concentration of such monomers ranges from 10 to 60, or from 10 to 50, or from 1o to 40% by weight of the total weight of the first modeling formulation, including any intermediate values and subranges therebetween.

In some embodiments, the (meth)acrylic oligomer is characterized, when hardened, by Tg of at least 50° C., is or comprises an acrylic oligomer, or, alternatively a mixture of two or more acrylic monomers or of one or more acrylic monomers and one or more methacrylic monomers.

Exemplary such oligomers include, but are not limited to, polyester urethane acrylates, epoxy acrylates, modified (e.g., amine modified) epoxy acrylate and the like. Non-limiting examples are presented in Table 1 below. Any other acrylic oligomers featuring the indicated Tg is contemplated. Those skilled in the art would readily recognize additional acrylate oligomers featuring Tg higher than 50° C.

In some embodiments, a total concentration of the (meth) acrylic oligomer(s) is the first modeling formulation ranges from 10 to 60%, or from 10 to 50%, or from 10 to 40%, or from 10 to 30%, or from 10 to 20%, by weight of the total weight of the first modeling formulation, including any intermediate values and subranges therebetween.

In some embodiments, the first modeling formulation may further comprise at least one curable (meth)acrylic monomer which provides, when hardened, a flexible material, characterized by Tg lower than 0° C., or lower than −10° C., or lower than −20° C.

In some embodiments, the (meth)acrylic monomer characterized, when hardened, by Tg lower than −10 or −20° C., is or comprises an acrylic monomer, or, alternatively a mixture of two or more acrylic monomers or of one or more acrylic monomers and one or more methacrylic monomers.

Acrylic and methacrylic monomers featuring such low Tg include, for example, ethoxylated monofunctional, or preferably multifunctional (e.g., difunctional or trifunctional), as described herein in any of the respective embodiments.

Exemplary such flexible acrylic monomers are presented in Table 1 below. Any other flexible acrylic (or methacrylic) monomers are contemplated. Those skilled in the art would readily recognize additional acrylate monomers featuring low Tg as indicated.

In some embodiments, a concentration of the flexible (meth)acrylic monomer, if present, ranges from 4 to 30, or from 4 to 25, or from 4 to 20, or from 4 to 15, or from 4.5 to 13.5 weight percents, of the total weight of the formulation, including any intermediate values and subranges therebetween.

In some embodiments, the flexible monomer is a multi-functional ethoxylated monomer as described herein, in which each of the (meth)acrylate groups are linked to an alkylene glycol group or chain, and the alkylene glycol groups or chains are linked to one another through a branching unit, such as, for example, a branched alkyl, cycloalkyl, aryl (e.g., bisphenol A), etc., as described in further detail hereinunder.

In some of any of the embodiments described herein, the first modeling formulation further comprises an additional curable (meth)acrylic monomer which provides, when hardened, a flexible material, characterized by Tg lower than 0° C., or lower than −10° C., or lower than −20° C.

In some embodiments, the additional flexible monomer is a di-functional monomer which comprises an alkylene glycol chain (a poly(alkylene glycol, as defined herein) that terminates at both ends by an acrylate or methacrylate group.

In some embodiments, the poly(alkylene glycol) chain features at least 5, preferably at least 10, e.g., from 10 to 15, alkylene glycol groups.

In some embodiments, the concentration of the additional flexible monomer as described herein ranges from 5 to 20, or from 5 to 15, weight percents, of the total weight of the formulation, including any intermediate values and subranges therebetween.

In some of any of the embodiments described herein, the first formulation comprises, as a flexible monomer having a low Tg as indicated herein only the material described herein as "an additional flexible monomer".

In some embodiments, the first formulation is used in combination with any second formulation that features, when hardened, Impact resistance value and/or HDT, as defined herein.

In some embodiments, the second modeling formulation comprises:

at least one curable (meth)acrylic, preferably acrylic, monomer characterized, when hardened, by Tg of at least 70° C.;

at least one curable (meth)acrylic, preferably acrylic, oligomer characterized, when hardened, by Tg of at least 10° C.; and at least one curable (meth)acrylic, preferably acrylic, ethoxylated monomer.

Herein, an "ethoxylated" material describes an acrylic or methacrylic compound which comprises one or more alkylene glycol groups, or, preferably, one or more alkylene glycol chains, as defined herein. Ethoxylated (meth)acrylate materials can be monofunctional, or, preferably, multifunctional, namely, difunctional, trifunctional, tetrafunctional, etc.

In multifunctional materials, typically, each of the (meth)acrylate groups are linked to an alkylene glycol group or chain, and the alkylene glycol groups or chains are linked to one another through a branching unit, such as, for example, a branched alkyl, cycloalkyl, aryl (e.g., bisphenol A), etc.

In some embodiments, the ethoxylated material comprises at least 5 ethoxylated groups, that is, at least 5 alkylene glycol moieties or groups. Some or all of the alkylene glycol groups can be linked to one another to form an alkylene glycol chain. For example, an ethoxylated material that comprises 30 ethoxylated groups can comprise a chain of 30 alkylene glycol groups linked to one another, two chains, each, for example, of 15 alkylene glycol moieties linked to one another, the two chains linked to one another via a branching moiety, or three chains, each, for example, of 10 alkylene glycol groups linked to one another, the three chains linked to one another via a branching moiety. Shorter and longer chains are also contemplated.

In some embodiments, the ethoxylated material comprises at least 8, or at least 10, or at least 12, or at least 15, or at least 18, or at least 20, or at least 25, or at least 30 ethoxylated (alkylene glycol) groups. The ethoxylated material can comprise one, two or more poly(alkylene glycol) chains, of any length, as long as the total number of the alkylene glycol groups is as indicated.

In some embodiments, the ethoxylated material is a flexible material, characterized, when hardened, by Tg lower than 0° C., preferably lower than −10° C. or lower than −20° C.

In some of any of the embodiments described herein, the ethoxylated curable monomer is characterized by a viscosity at room temperature lower than 1000 centipoises; and/or by a molecular weight of at least 500 grams/mol.

Non-limiting examples of ethoxylated materials suitable for inclusion in the second modeling formulation are presented in Table 6A hereinbelow.

In some of any of the embodiments described herein, the ethoxylated material is a trifunctional (meth)acrylate monomer. Exemplary such trifunctional monomers are also presented in Table 6A below. Other flexible, ethoxylated tri-functional monomers are contemplated. Those skilled in the art would readily recognize other trifunctional monomers featuring the indicated properties.

In some of any of the embodiments described herein, a concentration of the ethoxylated curable monomer in the second modeling formulation is at least 5, or at least 10, weight percents of the total weight of the second modeling formulation.

In some embodiments, the concentration of the ethoxylated curable material ranges from 5 to 50, or from 5 to 40, or from 10 to 50, or from 10 to 40, or from 10 to 30, % by weight of the total weight of the second modeling formulation, including any intermediate values and subranges therebetween.

In addition to the ethoxylated curable material, the second formulation comprises at least one curable (meth)acrylic, preferably acrylic, monomer characterized, when hardened, by Tg of at least 70° C.; and at least one curable (meth)acrylic, preferably acrylic, oligomer characterized, when hardened, by Tg of at least 10° C.

In some embodiments, the curable (meth)acrylic, preferably acrylic, monomer characterized, when hardened, by Tg of at least 70° C., is characterized by Tg of at least 85° C., when hardened, and include monofunctional and multifunctional monomers, and any mixture of such monomers, as described herein. Exemplary such monomers are presented in Table 5 below. Any other monomers featuring the indicated Tg are contemplated.

In some embodiments, the total concentration of such curable (meth)acrylic monomer(s) in the second modeling formulation ranges from 10 to 50% by weight of the total weight of the second modeling formulation.

Curable (meth)acrylic oligomers characterized, when hardened, by Tg of at least 10° C., include monofunctional, and preferably multifunctional oligomers such as, but not limited to, polyester urethane acrylates, epoxy acrylates, modified epoxy acrylates, etc. Those skilled in the art would readily recognize oligomers featuring the indicated Tg. Exemplary such oligomers are described hereinabove, and some are presented in Table 5 hereinbelow. Any other oligomers are contemplated.

In some embodiments, the total concentration of the curable (meth)acrylic oligomer in the second modeling formulation ranges from 10 to 50% by weight of the total weight of the second modeling formulation, including any intermediate values and subranges therebetween.

In some of any of the embodiments described herein, each of the first, second, and optionally other modeling material formulations independently comprises a photoinitiator, for initiating the polymerization or cross-linking (curing) upon exposure to curing energy (e.g., radiation).

In some embodiments, the photoinitiator is a free-radical initiator.

A free radical photoinitiator may be any compound that produces a free radical on exposure to radiation such as ultraviolet or visible radiation and thereby initiates a polymerization reaction. Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), monoacyl phosphine oxides (MAPO's) and bisacylphosphine oxides (BAPO's); benzoins and benzoin alkyl ethers such as benzoin, benzoin methyl ether and benzoin isopropyl ether and the like. Examples of photoinitiators are alpha-amino ketone, alpha-hydroxy ketone, monoacyl phosphine oxides (MAPO's) and bisacylphosphine oxide (BAPO's).

A free-radical photo-initiator may be used alone or in combination with a co-initiator. Co-initiators are used with initiators that need a second molecule to produce a radical that is active in the UV-systems. Benzophenone is an example of a photoinitiator that requires a second molecule, such as an amine, to produce a curable radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

In some embodiments, a concentration of the initiator in the first and/or the second modeling material formulation independently ranges from 0.5 to 5%, or from 1 to 5%, or from 2 to 5%, by weight of the total weight of the respective formulation.

In some of any of the embodiments described herein, the first and/or second modeling material formulation independently further comprises one or more additional materials, which are referred to herein also as non-reactive materials (non-curable materials).

Such agents include, for example, surface active agents (surfactants), inhibitors, antioxidants, fillers, pigments, dyes, and/or dispersants.

Surface-active agents may be used to reduce the surface tension of the formulation to the value required for jetting or for printing process, which is typically around 30 dyne/cm. Such agents include silicone materials, for example, organic polysiloxanes such as PDMS and derivatives therefore, such as those commercially available as BYK type surfactants.

Suitable dispersants (dispersing agents) can also be silicone materials, for example, organic polysiloxanes such as PDMS and derivatives therefore, such as those commercially available as BYK type surfactants.

Suitable stabilizers (stabilizing agents) include, for example, thermal stabilizers, which stabilize the formulation at high temperatures.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, a concentration of each of a surfactant and/or a dispersant and/or a stabilizer and/or a filler, if present, ranges from 0.01 to 2%, or from 0.01 to 1%, by weight, of the total weight of the respective formulation. Dispersants are typically used at a concentration that ranges from 0.01 to 0.1%, or from 0.01 to 0.05%, by weight, of the total weight of the respective formulation.

In some embodiments, the first and/or second formulation further comprises an inhibitor. The inhibitor is included for preventing or reducing curing before exposure to curing energy. Suitable inhibitors include, for example, those commercially available as the Genorad type, or as MEHQ. Any other suitable inhibitors are contemplated.

The pigments can be organic and/or inorganic and/or metallic pigments, and in some embodiments the pigments are nanoscale pigments, which include nanoparticles.

Exemplary inorganic pigments include nanoparticles of titanium oxide, and/or of zinc oxide and/or of silica. Exemplary organic pigments include nanosized carbon black.

In some embodiments, the pigment's concentration ranges from 0.1 to 2% by weight, or from 0.1 to 1.5%, by weight, of the total weight of the respective formulation.

In some embodiments, the first formulation comprises a pigment.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

Any of the first and/or second formulations described herein, in any of the respective embodiments and any combination thereof, can be provided within a kit, in which the first and second formulations are individually packaged.

In some embodiments, all the components of each formulation are packaged together. In some of these embodiments, the formulations are packaged in a packaging material which protects the formulations from exposure to light or any other radiation and/or comprise an inhibitor.

In some embodiments, the initiator is packaged separately from other components of each formulation, and the kit comprises instructions to add the initiator to the respective formulation.

The present inventors have devised a technique that further reduces the curling effect. In this technique, a structure, referred to herein as "a pedestal" is dispensed directly on the tray, and the layers that make up the object are thereafter dispensed on the pedestal. This embodiment is illustrated in FIGS. 10A-10B.

Figure 10A:
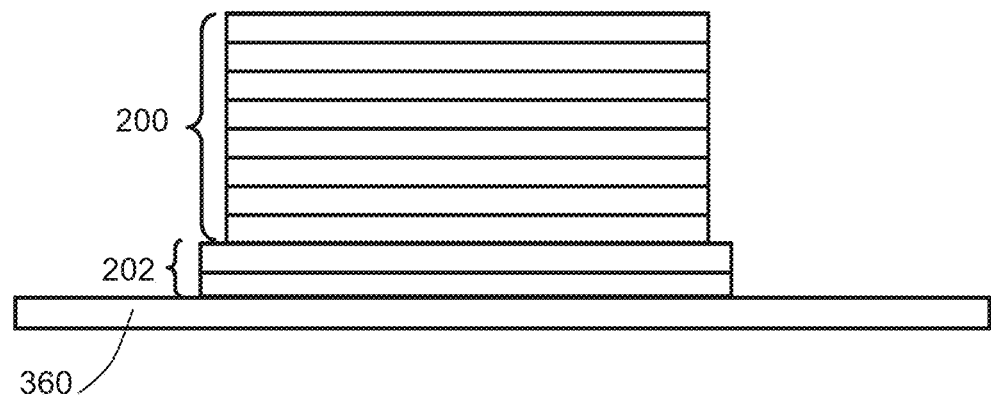
FIGS. 10A-10B are schematic illustrations of an object formed on a pedestal, according to some embodiments of the present invention.
Figure 10B:
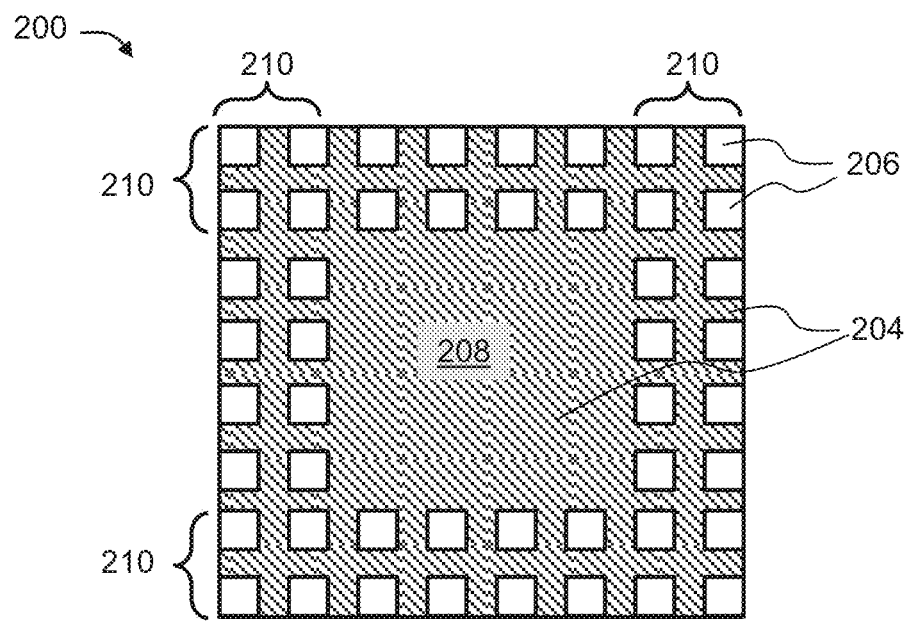

FIG. 10A shows a side view of a pedestal 202 on tray 360 wherein the layers of an object 200 are dispensed on pedestal 202. Object 200 can comprise, or be, a shelled structure (e.g., structure 60), made of the first and second modeling formulations as further detailed hereinabove. Alternatively, object 200 can be a non-shelled structure, or a shelled structure (e.g., structure 60), made of other modeling formulation, such as a commercially available modeling formulation.

Pedestal 202 optionally and preferably serves to ease the removal of object from the printing tray and thus may help prevent deformation by manual or mechanical damage. Pedestal 202 can also improve the object's accuracy in the Z direction (height), and/or may improve an object's accuracy in the X-Y directions.

Pedestal 202 preferably comprises a support formulation that includes a support material. Preferably the support formulation is soluble in liquid, e.g., in water. In various exemplary embodiments of the invention pedestal 202 comprises a combination of support formulation and modeling formulation (e.g., any of the first and second modeling formulations described herein). Preferably, the modeling formulation within pedestal 202 is of low Izod impact resistance, for example, less than 40 J/m. The advantage of this embodiment is that it reduces the tendency of the pedestal to lift from the tray.

Inaccuracies in Z may occur at the lowest layers of the printed object. This may be because the top surface of the tray at Z start level (the Z level of the tray when printing starts) may not be exactly at a height which enables the leveling device to reach and thus level the first layers deposited in the printing process, when the leveling device may be at its lowest point (e.g., because of inaccuracy in adjustments and/or incomplete flatness and horizon of the tray). As a result, the lower layers of object 200 may not be leveled by the leveling device and therefore their thickness may be greater than the designed layer thickness, therefore increasing the height of object 200 as printed in contrast to the object as designed. The use of pedestal 202 under the lowest point of the object solves this problem by specifying that the height at which the printing of the actual object starts may be the height at which the pedestal itself may be significantly leveled by the leveling device.

In various exemplary embodiments of the invention pedestal 202 has a core-shell structure, in which the shell comprises spaced pillars of modeling formulation with support formulation in-between, and the core comprises only soluble (e.g., water soluble) support formulation, and is devoid of any non-soluble modeling formulation. These embodiments are illustrated in FIG. 10B which is a top view illustration of a typical layer of pedestal 202, having a pedestal core (shown as a core region 208 in FIG. 10B) and pedestal shell (shown as an envelope region 210 in FIG. 10B). The support formulation is shown at 204 (patterned filling) and the modeling formulation pillars are shown at 206 (white filling).

The advantage of forming a pedestal with core-shell structure as defined above is that it solves the problems of Z inaccuracies and curling while minimizing the use of modeling formulation, which is typically more expensive, and tends to leave visible remnants at the bottom of object 200.

Herein throughout, the phrase "elastic modulus" refers to Young's modulus, as determined by response of a material to application of tensile stress.

The elastic modulus is determined as the gradient of stress as a function of strain over ranges of stress and strain wherein stress is a linear function of strain (e.g., from a stress and strain of zero, to the elastic proportionality limit, and optionally from zero strain to a strain which is no more than 50% of the elongation at failure).

The elongation at failure, which is also referred to herein and in the art as elongation at break, $\varepsilon_R$, is determined as the maximal strain (elongation) which can occur (upon application of tensile stress equal to the ultimate tensile strength) before failure of the tested material occurs (e.g., as rupture or necking).

Recovery is determined by releasing the tensile stress after subjecting the tested material as the ratio of the decrease in length to a prior strain after a material (e.g., elastic layer) is subjected to a prior strain which is almost equal to the elongation at failure (optionally about 90% of the elongation at failure, optionally about 95% of the elongation at failure, optionally about 98% of the elongation at failure, optionally about 99% of the elongation at failure, wherein the elongation at failure can be determined using an equivalent sample). Thus, for example, a material extended to an elongation at failure which is 200%, and which upon release of tensile stress returns to a state characterized by a strain of 20% relative to the original length, would be characterized as having a recovery of 90% (i.e., 200%-20% divided by 200%).

Herein, "Tg" refers to glass transition temperature defined as the location of the local maximum of the E" curve, where E" is the loss modulus of the material as a function of the temperature. Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. The lowest temperature of the Tg range is referred to herein as Tg(low) and the highest temperature of the Tg range is referred to herein as Tg(high).

In any of the embodiments described herein, the term "temperature higher than Tg" means a temperature that is higher than the Tg temperature, or, more preferably a temperature that is higher than Tg(high).

Herein, "Tg sum" describes the total calculated Tg of a formulation (e.g., a modeling formulation), as calculated by summing individual Tg values of polymeric components of the formulation. The summation is optionally and preferably a weight sum, wherein each Tg value is multiplied by the relative amount (e.g., weight percentage) of the respective polymeric components of first modeling formulation. The polymeric components can be the respective curable components that provide a polymeric component featuring a Tg, or non-curable polymeric components added to the formulation.

Herein throughout, the term "object" describes a final product of the additive manufacturing. This term refers to the product obtained by a method as described herein, after removal of the support material, if such has been used as part of the building material. The "object" therefore essentially consists (at least 95 weight percents) of a hardened (e.g., cured) modeling material.

The term "object" as used herein throughout refers to a whole object or a part thereof.

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "cured modeling material" or "hardened modeling material" describes the part of the building material that forms the object, as defined herein, upon exposing the dispensed building material to curing, and, optionally, if a support material has been dispensed, also upon removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the building material which is dispensed so as to form the object, as described herein. The modeling material formulation is an uncured modeling formulation (unless specifically indicated otherwise), which, upon exposure to curing energy, forms the object or a part thereof.

In some embodiments of the present invention, a modeling material formulation is formulated for use in three-dimensional inkjet printing and is able to form a three-dimensional object on its own, i.e., without having to be mixed or combined with any other substance.

The phrase "digital materials", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

The term "branching unit" as used herein describes a multi-radical, preferably aliphatic or alicyclic moiety, and optionally an aryl or heteroaryl moiety. By "multi-radical" it is meant that the branching unit has two or more attachment points such that it links between two or more atoms and/or groups or moieties.

That is, the branching unit is a chemical moiety that, when attached to a single position, group or atom of a substance, creates two or more functional groups that are linked to this single position, group or atom, and thus "branches" a single functionality into two or more functionalities.

In some embodiments, the branching unit is derived from a chemical moiety that has two, three or more functional groups. In some embodiments, the branching unit is a branched alkyl or a branched linking moiety as described herein.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like. The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S($=$O)$_2$—OR' end group, as this term is defined hereinabove, or an —O—S($=$O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'— linking group, as these phrases are defined hereinabove, with R' and R" as defined herein. The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO$_2$ group.

The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'— linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" end group or a —SC(=S)NR'— linking group, as these phrases are defined hereinabove, with R' and R" as defined herein.

The term "N-dithiocarbamate" describes an R"SC(=S)NR'— end group or a —SC(=S)NR'— linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'— linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)—NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$R'" end group or a —O—[(CR'R")$_z$—O]$_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silanol" describes a —Si(OH)R'R" group, or —Si(OH)$_2$R' group or —Si(OH)$_3$ group, with R' and R" as described herein.

The term "silyl" describes a —SiR'R"R'" group, with R', R" and R'" as described herein.

As used herein, the term "urethane" or "urethane moiety" or "urethane group" describes a Rx-O—C(=O)—NR'R" end group or a -Rx-O—C(=O)—NR'— linking group, with R' and R" being as defined herein, and Rx being an alkyl, cycloalkyl, aryl, alkylene glycol or any combination thereof. Preferably R' and R" are both hydrogen.

The term "polyurethane" or "oligourethane" describes a moiety that comprises at least one urethane group as described herein in the repeating backbone units thereof, or at least one urethane bond, —O—C(=O)—NR'—, in the repeating backbone units thereof.

It is expected that during the life of a patent maturing from this application many relevant curable materials featuring properties (e.g., Tg when hardened) as described herein, will be developed, and the scope of the respective curable materials is intended to include all such new materials a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Materials and Methods

3D Inkjet printing of shelled objects was performed using Objet C2, C3 Systems, in a DM mode (e.g., a DM mode referred to as DM 5160 or 5130), according to the method described in U.S. Patent Application having Publication No. 2013/0040091. Generally, all printed objects were comprised of a core made of the first formulation (RF, Part A) and the second formulation (DLM, Part B), at a ratio as indicated, and one or more shells, wherein, optionally, one shell comprises the first formulation, and optionally, another shell comprises the second formulation, unless otherwise indicated.

HDT measurements were performed on Ceast vicat/HDT instrument according to ASTM D-648-06.

Print deformations (curling) were quantitatively assessed using a 230×10×10 mm printed bar. Upon printing, the bar was left within the printing system, in a closed cabinet, for 1 hour, and was thereafter stored at room temperature for 24 hours. The bar was then placed on a flat plane (flat table) and curling was measured by putting weight on one side of the bar and measuring the height of the bar edge from the plane in mm. For this study an elevation of 4 mm or less was considered as acceptable for most mainstream applications.

Tray temperature was measured directly by using Thermocouple connected to data logger apparatus.

Measurements of other properties were performed according to standard protocols, unless otherwise indicated.

All reagents and materials composing the tested formulations were obtained from known vendors.

Example 1

Modeling Material Formulations and Printed Objects Made Therefrom

The present inventors have searched for formulations which can be used in AM of shelled objects, yet, would exhibit improved properties such as improved HDT and improved Impact resistance, and reduced curling.

The present inventors have recognized that while curling can be reduced by applying heat to the dispensed layers, such heat can only be applied when the formulations feature, when hardened, HDT above the heat temperature, yet, that elevated HDT of a hardened formulation typically results in reduced Impact resistance.

The present inventors have therefore thought for formulations which provide hardened material with both high HDT and high Impact resistance, when used in AM of shelled objects, and which allow heating the dispensed layers so as to reduce or avoid curling, without causing deformation of the printed layers upon said heating.

As described in detail in U.S. Patent Application having Publication No. 2013/0040091, solid freeform fabrication (SFF) of shelled objects is performed using two formulations: a first formulation, Part A, referred to also as RF (reinforcer); and a second formulation, Part B, referred to also as DLM.

The present inventors have now designed and successfully practiced in AM of shelled objects the following formulations.

A First Formulation:

The first formulation (Part A, RF) was designed so as to provide, when hardened, a rigid material characterized by high HDT (e.g., higher than 90° C., or higher than 100° C.).

The present inventors have uncovered that the first formulation should include a curable methacrylic monomer which features, when hardened, Tg higher than 150° C. In studies described in further detail hereinafter, the present inventors have characterized a desired curing rate of such a monomer, namely, a curing rate lower than 5,000 mW/minute or lower than 4,400 mW/minute (for a curing rate determined as described hereinafter).

The present inventors have further determined that an amount of such a monomer should be at least 35% by weight of the total weight of the first formulation.

The first formulation, according to embodiments of the present invention, may further include:

at least one curable acrylic monomer characterized, when hardened, by Tg of at least 85° C.;

at least one curable (meth)acrylic oligomer, characterized, when hardened, by Tg of at least 50° C.; and optionally, at least one curable (meth)acrylic monomer characterized, when hardened, by Tg lower than 0° C., or lower than −20° C., and further optionally, a photoinitiator, a surfactant, a dispersing agent and/or an inhibitor.

Table 1 below presents exemplary materials suitable for inclusion in the first (Part A, RF) formulation, according to some embodiments of the present invention:

TABLE 1

| Component | Exemplary Materials | Percentage (%) |
|---|---|---|
| Curable acrylic monomer, characterized, when hardened, by Tg > 85° C. | ACMO (CAS: 5117-12-4) (Tg = 88° C.) IBOA (CAS:5888-33-5) (Tg = 95° C.) SR 833S (CAS: 42594-17-2) (Tg = 185° C.) SR454 ethoxylated (3) TMPTA (CAS: 28961-43-5) (Tg = 103° C.) SR508 (CAS 57472-68-1) (Tg = 104° C.) SR368 (CAS: 40220-08-4) (Tg = 272° C.) | 10-40 |

TABLE 1-continued

| Component | Exemplary Materials | Percentage (%) |
|---|---|---|
| Curable Methacrylic monomer, characterized, when hardened, by Tg > 150° C. | SR 834 (CAS: 43048-08-4) SR-423D (CAS: 7534-94-3) | 35-50 |
| (Meth) acrylic Oligomer, characterized, when hardened, by Tg > 50° C. | BR-441 (Di functional Aliphatic polyester urethane Acrylate) (Tg = 71° C.) PH 6019 (Trifunctional Aliphatic urethane acrylate) (Tg = 51° C.) Eb3703 amine modified epoxy Diacrylate (Tg = 57° C.) | 10-40 |
| (Meth)acrylic flexible monomer, Having low Tg < −20° C | SR 9036 (Ethoxylated (30) bisphenol A dimethacrylate) (CAS: 41637-38-1) (Tg = −43° C.) SR415 (Ethoxylated (20) Trimethylol propane triacrylate) (CAS: 28961-43-5) (Tg = −40° C.) SR 9035 (Ethoxylated (15) Trimethylol propane triacrylate (Tg = −30° C.) SR610 (Poly(ethylene glycol) (600) diacrylate) (Tg = −40° C.) | 5-30 |
| Photoinitiator | BAPO type (Bis Acyl Phosphine Oxide) Alpha Hydroxy ketone MAPO (Monoacylphosphine oxides) | 0.5-5 |
| Surfactant | BYK Type (PDMS derivatives) | 0.01-1 |
| Dispersing agent | BYK Type (PDMS derivatives) | 0.01-1 |
| Inhibitor | MEHQ Genorad Type | 0.1-1 |
| Inorganic Pigment | Nano scale Titanium Oxide Nano scale Zirconium Oxide Nano Silica | 0.1-0.3 |
| Organic pigment | Nano scale Carbon black | 0.1-0.15 |

Photo DSC Measurements:

Photo DSC measurements were performed on Mettler Toledo, with Lightningcure™: Curable type: Alumina curable; Sample size: 10-15 mg.

Tests were performed while maintaining a sample for 2 minutes at 60° C., thereafter subject it to polymerization with a single flash of 0.1 second duration and then maintaining it for additional 1 minute at 60° C. Sampling interval of 0.1 second was used for reading the measurement data.

The following materials and formulations were tested:

RGD531, DR-71-black2 (also referred to herein as RF71), Modified DR-71 in which SR834 is replaced by SR833 and SR844.

Table 2 below presents the chemical composition of RGD531.

Table 3 below presents the chemical composition GR-71-black2 (RF71).

TABLE 2

| Material | Wt. percentage (%) |
|---|---|
| Mono functional Acrylic monomer Tg > 85° C. | 10-30 |
| Methacrylic monomer, Tg > 150° C. | 5-20 |
| Polyester based Urethane Acrylate | 5-20 |
| (Meth)acrylic Oilgomer, Tg > 50° C. | 10-20 |
| Acrylic multi functional monomer Tg > 85° C. | 20-30 |
| Inhibitor | 0.1-0.3 |
| Photoinitiator | 0.5-3 |
| Surfactant | 0.01-1 |
| Epoxy Acrylate | 1-5 |

TABLE 2-continued

| Material | Wt. percentage (%) |
|---|---|
| Dispersing agent | 0.01-0.05 |
| Inorganic pigment nano scale | 0.2-0.6 |

TABLE 3

| Material | Wt. percentage (%) |
|---|---|
| Mono functional Acrylic monomer Tg > 85° C. | 10-30 |
| Multi functional Acrylic monomer Tg > 85° C. | 10-20 |
| SR 834 | >35% |
| (Meth)acrylic Oligomer, Tg > 50° C. | 10-20 |
| (Meth) acrylic flexible monomer, Having low Tg < −20° C | 5-15 |
| Inhibitor | 0.1-0.3 |
| Photoinitiator | 2-5 |
| Surfactant | 0.01-1 |
| Dispersant | 0.01-1 |
| Organic pigment | 0.5-0.15 |

Table 4 below presents the data obtained in the Photo DSC measurements for each of the tested formulations and materials. The curing rate is determined by the slope of the curves obtained for the Mw (MiliWatt) as a function of time, for each sample.

TABLE 4

| Formulation/Material | Enthalpy (J/gram) | HDT/Tg (° C.) | Curing Rate (Slope; mW/minute) |
|---|---|---|---|
| RGD531 | 97.9 | HDT: 90-100 | 4400 |
| DR-71 | 52.4 | HDT: 140-150 | 2480 |
| Modified DR-71 | 142.1 | HDT: 115 | 9980 |
| SR833 | 331.7 | Tg: 185 | 24000 |
| SR834 | 63.4 | Tg: >200 | 3300 |

As shown in Table 4, at lower curing rates, higher HDT values are obtained. Such high HDT values are obtained only when SR-834 is in an amount of 35% wt. or higher. In the formulations where SR-834 is absent or is replaced by a material that is known to cure faster, such high HDT values were not obtained.

The Second Formulation:

The second formulation (Part B, DLM) was designed so as to provide, when hardened, a material which is less rigid than the material obtained from a hardened first formulation, and which is characterized by high toughness (e.g., Izod notch Impact of about 52-58 J/m), and HDT lower than the first hardened formulation (e.g., HDT of about 40-41° C.).

In studies described in further detail hereinafter, the present inventors have uncovered that the second formulation should include a trifunctional curable (meth)acrylic (acrylic or methacrylic) monomer which comprises (e.g., at least 5) ethoxylated groups (also referred to herein as ethoxylated (meth)acrylic monomer, or simply as ethoxylated monomer or material). The present inventors have further determined that improved performance is obtained when the ethoxylated trifunctional monomer is characterized by a viscosity at room temperature lower than 1000 centipoises; and/or a molecular weight of at least 500 grams/mol. The ethoxylated material features, when hardened, Tg lower than −20° C.

The present inventors have further determined that an amount of such a trifunctional monomer should be at least 5% by weight of the total weight of the first formulation.

The second formulation, according to embodiments of the present invention, may further include:

at least one curable (meth)acrylic monomer characterized, when hardened, by Tg of at least70° C.; and at least one curable (meth)acrylic oligomer characterized, when hardened, by Tg of at least 10° C., and optionally, a photoinitiator, a surfactant, a dispersing agent and/or an inhibitor.

Table 5 below presents exemplary materials suitable for inclusion in the second (Part B, DLM) formulation, according to some embodiments of the present invention:

TABLE 5

| Material | Examples | Percentage (%) |
|---|---|---|
| Curable (meth) acrylic monomer, characterized, when hardened, by Tg > 85° C. | ACMO (CAS: 5117-12-4) (Tg = 88° C.) IBOA (CAS: 5888-33-5) (Tg = 95° C.) SR 833S (CAS: 42594-17-2) (Tg = 185° C.) SR454 ethoxylated (3) TMPTA (CAS 28961-43-5) (Tg = 103° C.) SR508 (CAS 57472-68-1) (Tg = 104° C.) SR368 (CAS 40220-08-4) (Tg = 272° C.) SR423 (CAS 7534-94-3) (Tg = 110° C.) | 10-50 |
| Curable (meth)acrylic oligomer characterized, when hardened, by Tg > 10° C. | CN-991 (Aliphatic polyester based Urethane diacrylate) (Tg = 40° C.) PH 6019 Aliphatic Urethane TriAcrylate (Tg = 51° C.) Eb3708 (Modified bisphenol-A epoxy diacrylate) (Tg = 21° C.) | 10-50 |
| Curable ethoxylated trifunctional (meth) acrylic monomer, characterized, when hardened, by Tg < −20° C. | SR 9036 (Ethoxylated (30) bisphenol A dimethacrylate) (CAS 41637-38-1) (Tg = −43° C.) SR415 (Ethoxylated (20) Trimethylol propane triacrylate) (CAS 28961-43-5, Tg = −40° C.) SR 9035 (Ethoxylated (15) Trimethylol propane triacrylate) (Tg = −30° C.) SR610 (Poly(ethylene glycol) (600) diacrylate) (Tg = −40° C.) * Other examples are shown in Table 6 below | 5-40 |
| Photoinitiator | BAPO type (Bis Acyl Phosphine Oxide) Alpha Hydroxy ketone MAPO (Monoacylphosphine oxides) | 0.5-5 |
| Surfactant | BYK Type (PDMS derivatives) | 0.01-1 |
| Dispersing agent | BYK Type (PDMS derivatives) | 0.01-1 |
| Inhibitor | MEHQ Genorad Type | 0.1-1 |

The present inventors have uncovered that ethoxylated monomers increase the Impact values of the hardened formulation, and can further provide HDT of 40° C. or higher.

Table 6A below presents exemplary ethoxylated materials, and their properties, which are suitable for inclusion in the second formulation (Part B). The Impact and HDT provided by these formulations are presented in Table 6C below.

Table 6B below presents exemplary materials featuring low Tg which were found in the above-described experiments, as failing to provide the desired properties.

TABLE 6A

| Material | | MW (gram/mol) | Number of Ethoxylated groups | Viscosity (Cp at 25° C.) |
|---|---|---|---|---|
| SR-9036 | Ethoxylated (30) bisphenol A dimethacrylate | 2156 | 30 | 610 |
| SR-415 | Ethoxylated (20) Trimethylolpropane Triacrylate | 1176 | 20 | 225 |
| SR430 | Ethoxylated 18 Tristyrylphenol acrylate (RSP(18EO)A) | 1249 | 18 | 825 |
| SR9035 | Ethoxylated 15 Trimethylolpropane Triacrylate | 956 | 15 | 177 |
| SR567P | Ethoxylated 25 C22 methacrylate | 1494 | 25 | 250 |
| SR480 | Ethoxylated 10 bisphenol A DMA | 808 | 10 | 410 |
| SR499 | Ethoxylated (6) Trimethylolpropane Triacrylate | 554 | 6 | 92 |
| SR-610 | PEG 600 diacrylate | 726 | 13 | 100 |

TABLE 6B

| | Material | Izod Impact (J/m) | HDT (° C.) |
|---|---|---|---|
| CN-131 | Mono functional Aromatic Epoxy Acrylate | 14.1 | <40 |
| Genomer 4188/EHA | Aliphatic Urethane Acrylate | 15 | <40 |
| CN-990 | Siliconized Urethane Acrylate Oligomer | 29.07 | 41 |
| SR 395 | Iso Decyl Acrylate | <15 | <40 |
| SR-256 | 2(2-Ethoxylated) EthylAcrylate (EOEOEA) | 21.6 | <40 |
| SR-495 | Capro lactone Acrylate | 40 | 40 |
| SR-395 | Iso Decyl Acrylate | <15 | <40 |

The present inventors have further tested the properties obtained when using two Part B formulations deferring by the type of ethoxylated monomer. One formulation is RGD515, which comprises, as an ethoxylated monomer, SR9036 (see, Table 6A), and in the other, SR9036 was replaced by SR415 (see, Table 6A).

The properties provided by these formulations are presented in Table 6C.

TABLE 6C

| | Impact, J/m | HDT, ° C. |
|---|---|---|
| Formulation with SR9036 | 80 | 40.9 |
| Formulation with SR415 | 50 | 42 |

As can be seen from Tables 6A-6C, low Tg curable monomers should feature at least 3, preferably at least 5 ethoxylated groups, a viscosity range of 50-1000 centipoises (Cp) at room temperature; and MW range of 500-3000 grams/mol.

While formulations comprising a difunctional ethoxylated monomer feature higher Impact, formulations comprising a trifunctional ethoxylated monomer feature higher HDT, improved dimensional stability, and higher Elastic modulus, and thus are advantageous.

In some embodiments, a concentration of this material in the second formulation is in a range of 10-50% by weight.

Elastic Moduli Ratio:

In some embodiments of the present invention, the first and the second modeling formulations are selected according to their characteristic elastic moduli. Computer simulations have been conducted in order to determine a preferred ratio between the elastic moduli of the two modeling formulations. The computer simulations were performed for various combinations in which the first modeling formulation is a formulation that is commercially available under the trade name RGD531, and having an elastic modulus of 3000 MPa. Seven types of formulations were tested as the second formulations. These are referred to as Soft-30, Soft-16, RGD515, M-1, M-2, M-3, and M-4.

The computer simulations included analysis of stress distribution resulting from a crack in the second modeling formulation. The results of the simulations are provided in Table 7 and FIGS. 1A-1G. In FIGS. 1A-1G, the lower layer corresponds to the first modeling formulation (RGD531, in the present Example), and the upper layer corresponds to the respective second modeling formulation (Soft-30, Soft-16, RGD515, M-1, M-2, M-3, and M-4, respectively).

TABLE 7

| Second Formulation | Young's modulus [MPa] | Max stress value and location |
|---|---|---|
| Soft-30 | 90 | 400 MPa in the first modeling formulation |
| Soft-16 | 550 | 283 MPa in the first modeling formulation |
| RGD515 | 1000 | 250 MPa in the first modeling formulation 250 MPa at the interface |

TABLE 7-continued

| Second Formulation | Young's modulus [MPa] | Max stress value and location |
|---|---|---|
| M-1 | 1330 | between the two formulations, under the crack main stress of 250 MPa at the bottom of the crack and at the interface between the two formulations, under the crack 200 MPa in the first modeling formulation |
| M-2 | 1600 | main stress of 257 MPa at the bottom of the crack and at the interface between the two formulations under the crack 257 MPa in the first modeling formulation |
| M-3 | 1700 | main stress of 269 MPa at the bottom of the crack 220 MPa at the interface between the two formulations, under the crack |
| M-4 | 1800 | main stress of 285 MPa at the bottom of the 220 MPa at the interface between the two formulations, under the crack |

Table 7 demonstrates that there is a ratio between the elastic moduli for which the distribution of stress is optimal. In the present example, the optimal distribution of stress is achieved when the elastic modulus of the second modeling formulation is from about 1000 to about 1330, corresponding to a ratio between the elastic moduli of from 2.7 to 3.0.

In a preferred embodiment of the invention, the ratio between the elastic modulus of the first formulation and the elastic modulus of the second formulation is from about 2.7 to about 2.9, more preferably from about 2.75 to about 2.85. This preferred ratio is based on the observation by the present Inventors that when the first modeling formulation has an elastic modulus of 3000 MPa, the optimal distribution is obtainable for a second modeling formulation having an elastic modulus which is higher than the elastic modulus of RGD515 (1000 MPa) and lower than the elastic modulus of M-1 (1330 MPa).

It was found by the present Inventors that the preferred ratios are obtainable, for example, when the first modeling formulation is DR-71-Black2, also referred to herein as DR-71 or RF71, or is a formulation referred to herein as DR-71* or RF71*, and the second modeling formulation is Di-69-1, which is also referred to herein as DI-69.

Example 2

The Heating Element

Exemplary first and second formulations according to the present embodiments were used in a method as described herein in printing an object shaped as a bar having dimensions of 230×10×10 mm, while heating the receiving medium (tray) at various temperatures (without applying IR lamp radiation). The effect of tray temperature on the HDT and the curling (with no pedestal) of the printed object is presented in Table 8 below.

TABLE 8

| Tray Temperature (° C.) | HDT Out of the printer (° C.) | Curling (mm) |
|---|---|---|
| 38.9 | 65.7 ± 1.6 | 2.7 |
| 49.3 | 71.1 ± 1.6 | 1.7 |
| 60.3 | 75.6 ± 1.1 | 0.5 |
| 72.0 | 75.5 ± 0.7 | −1.2 |
| 87.9 | 93.0 ± 1.0 | −3.0 |
| 99.6 | 97.5 | −3.5 |

As can be seen, at 60° C., no curling was observed.

The effect of heating the tray to 60° C. while further operating a ceramic lamp is presented in Table 9.

TABLE 9

| Ceramic Lamp Voltage (Volts) | HDT Out of the printer (° C.) | Curling (mm) |
|---|---|---|
| 0 | 75.6 ± 1.1 | 0.5 |
| 160 | 78.9 ± 1.3 | 0.8 |
| 180 | 82.6 ± 1.8 | 1.1 |
| 215 | 91.6 ± 1.0 | 2.0 |

In additional assays, the effect of thermal post treatment, at 150° C., for two hours, on the HDT of the printed object was tested, with and without application of heat to the dispensed layers.

HDT of the printed object was measured for "Cold Printer", where no heating was applied to the dispensed layers; and for "HOT Printer", where tray was heated at 60° C. and a Ceramic IR Lamp was operated at 180 Volts. The obtained data is presented in Table 10.

TABLE 10

| Ceramic Lamp Power (Volts) | HDT Out of the printer (° C.) | HDT After Thermal post treatment (150° C., 2 Hours) |
|---|---|---|
| Cold printer | 88.5 ± 4.4 | 146.8 ± 1.8 |
| Hot printer | 101-112 | 146-151 |

Figure 4:
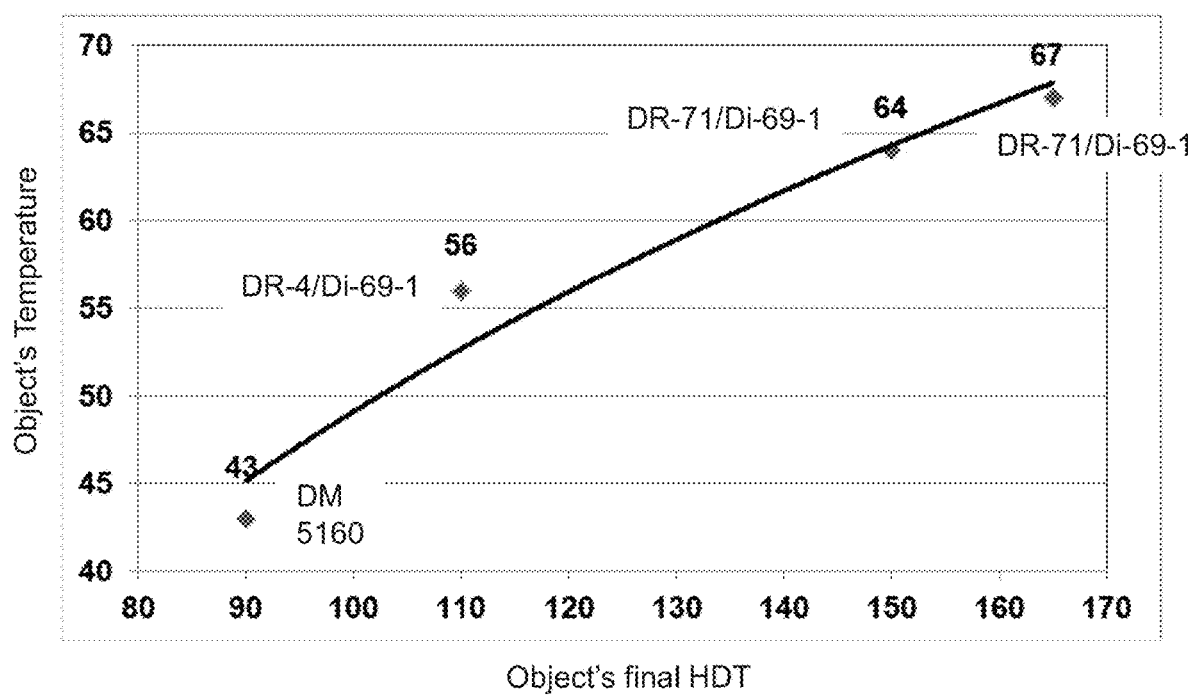
FIG. 4 is a graph of a temperature ensuring curling of less than 3 mm as a function of the final HDT of the printed object, for four different formulation or combination of formulations.

FIG. 4 is a graph that shows the temperature of the printed object that ensures curling of less than 3 mm, as a function of the final HDT of the printed object, for four different formulation or combination of formulations. As shown, the temperature of the printed object that ensures reduced curling increases with the final HDT of the object. For example, for printing ABS DM having final HDT of about 90° C., it is sufficient to heat the printed object to 43° C. For printing ABS DM having final HDT of 165° C., it is preferred to heat the printed object to about 67° C.

Example 3

The Printed Object
Effect of RF Concentration in the Core:

The effect of the concentration of the first formulation (Part A, RF) in the core region on the HDT of the core and of the final object was tested.

In exemplary measurements, a Part A formulation referred to herein as RF71 was used in combination with a Part B formulation, referred to herein as DI-69.

In additional exemplary measurements, a Part A formulation referred to herein as RF4w was used in combination with a DI-69 Part B formulation.

Table 11 below presents the chemical composition of RF4w.

TABLE 11

| Material | Wt. percentage (%) |
| --- | --- |
| Mono functional Acrylic monomer Tg > 85° C. | 10-30 |
| Multi functional Acrylic monomer Tg > 85° C. | 10-30 |
| SR834 | >35% |
| Polyester Urethane Acrylate | 5-15 |
| (Meth) acrylic flexible monomer. Having low Tg < −20° C | 10-30 |
| Inhibitor | 0.1-0.3 |
| Photoinitiator | 1-5 |
| Surfactant | 0.01-1 |
| Dispersant | 0.01-1 |
| Inorganic pigment | 0.5-1 |

Samples having a thickness of 6.35 mm were printed as follows:
DM-ABS or DABS: Full DM 5160 Structure
DM-ABS PC or DABS PC: same with thermal post curing
RND: Only the Core structure, Random DM
RND PC: Same with thermal post curing FIGS. 2A-2B present the effect of various concentrations of RF71 in the core on the HDT of the various printed objects, 6.35 mm in thickness (FIG. 2A), and the effect of various concentrations of RF4w in the core on the HDT of the various printed objects, 6.35 mm in thickness (FIG. 2B).

Figure 2A:
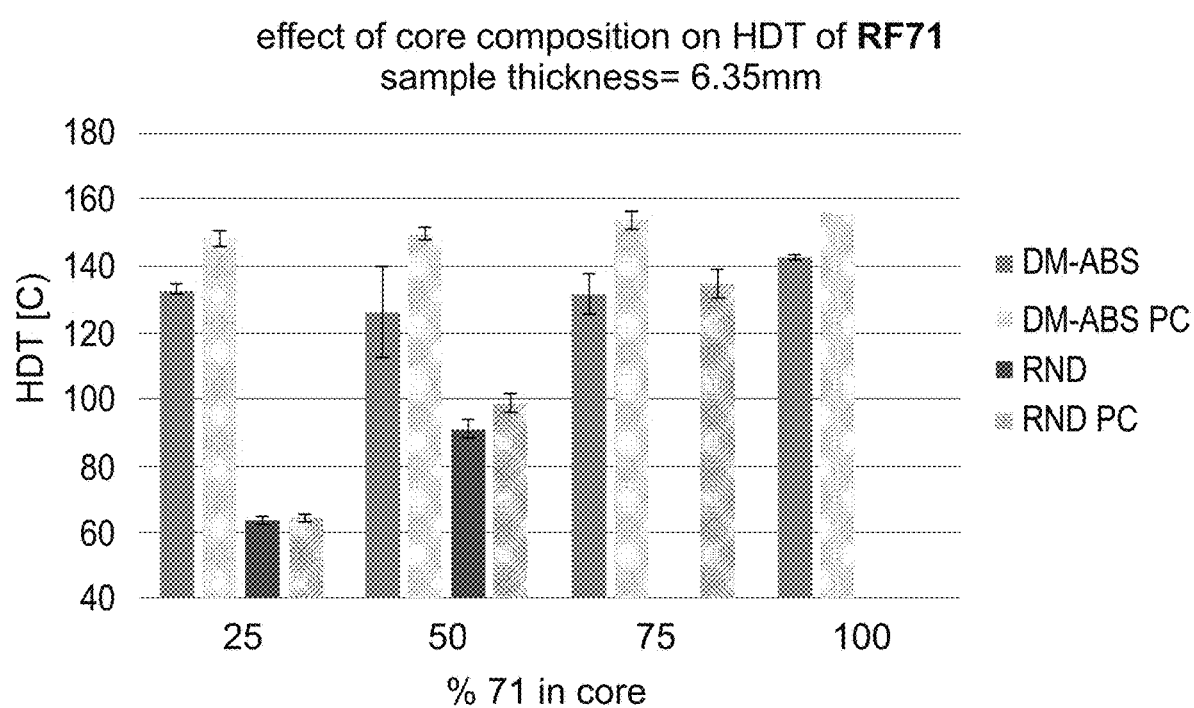
FIGS. 2A-2B show the effect of various concentrations of exemplary formulations according to some embodiments of the present invention (a formulation referred to as RF4w in FIG. 2A and a formulation referred to as RF71 in FIG. 2B) in a core on the HDT of the various printed objects.
Figure 2B:
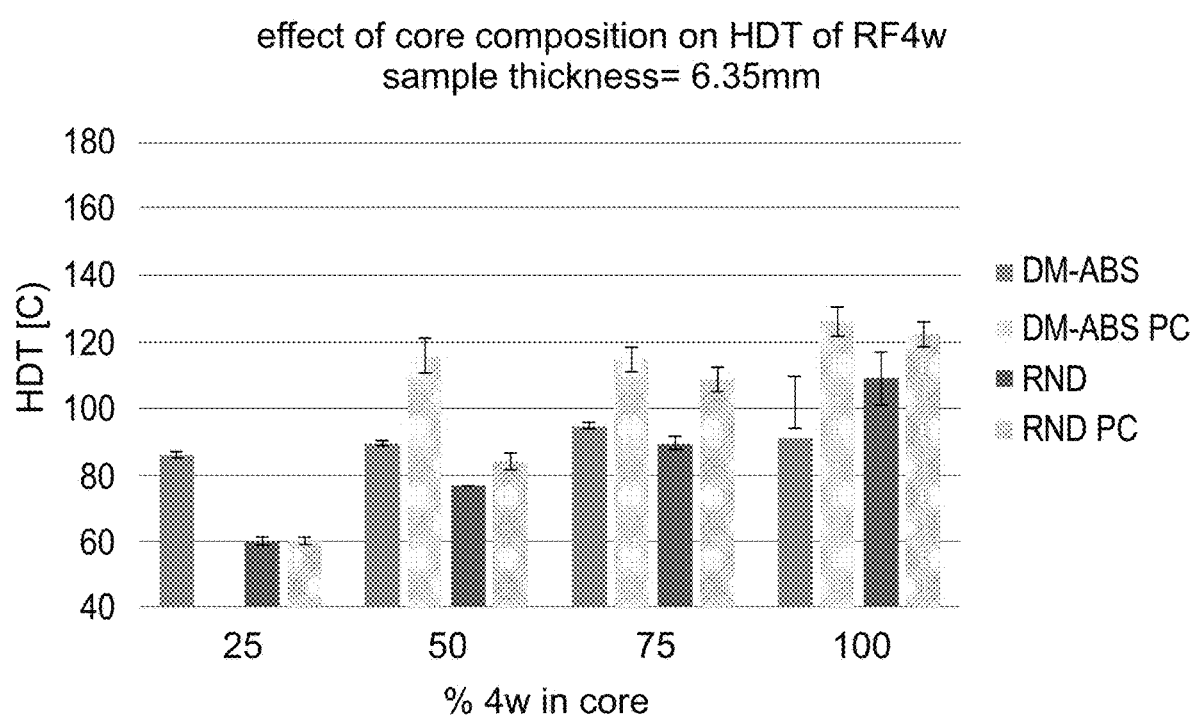

As can be seen in FIGS. 2A-2B, increasing the amount of the Part A formulation in the core region increases the HDT of the core. However, in the ABS DM mode, when the core is surrounded by a shell, the overall HDT is generally the same, irrespectively of the percentage of the first modeling formulation in the core. The same trend is observed for both tested formulations, and for both samples, indicating that the HDT of the object is not affected by the relative amount of Part A in the core.

Further the effect of the concentration of the first formulation (Part A, RF) in the core region on the Impact resistance (Izod) of the final object was tested.

In exemplary measurements, a Part A formulation referred to herein as RF71 was used in combination with a Part B formulation, referred to herein as DI-69.

In additional exemplary measurements, a Part A formulation referred to herein as RF4w was used in combination with a DI-69 Part B formulation.

Figure 3A:
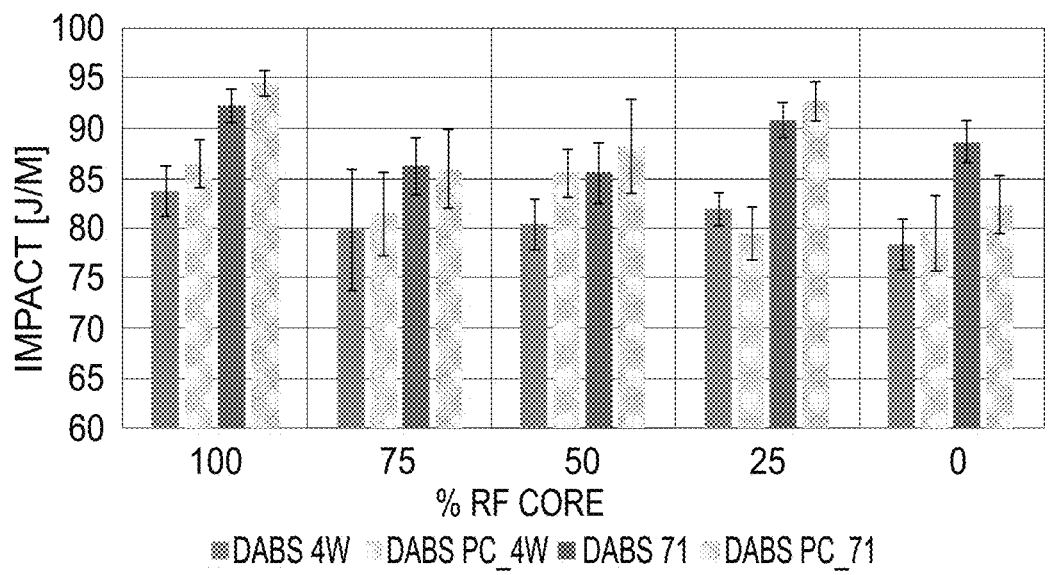
FIGS. 3A-3B show the effect of various concentrations of exemplary formulations according to some embodiments of the present invention, a formulation referred to as RF4w and a formulation referred to as RF71 (FIG. 3A) in a core on the Impact resistance of the various printed objects, compared to an effect of various concentrations of a previously described formulation referred to herein as RF535 (FIG. 3B)
Figure 3B:
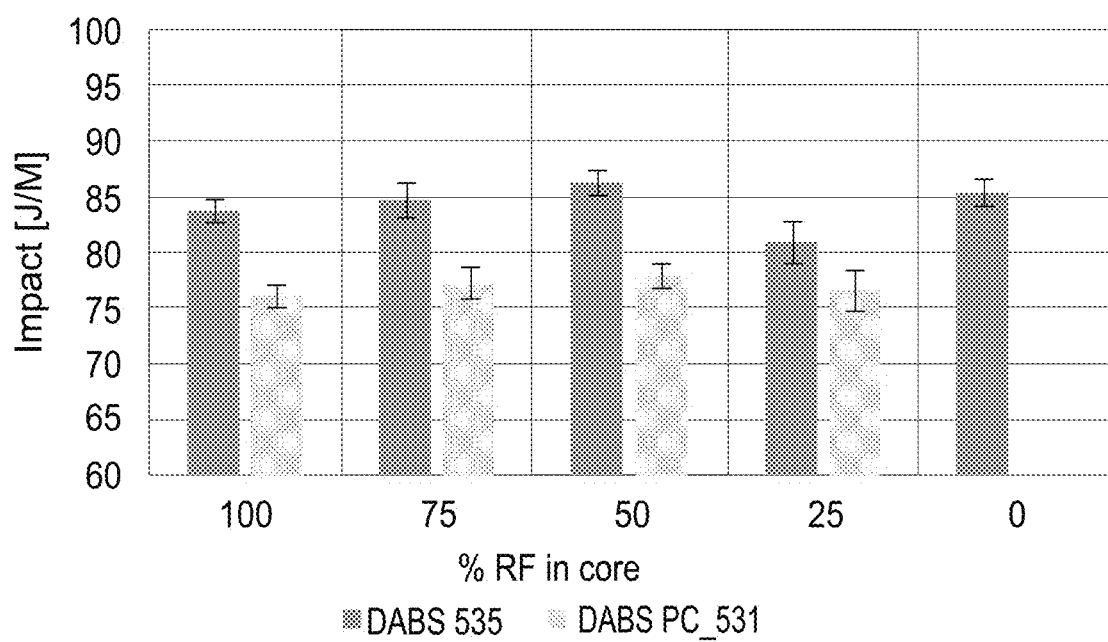

FIGS. 3A-3B present the effect of various concentrations of RF71 or RF4w (FIG. 3A) and of a previously described formulation, RG535 (FIG. 3B) in the core, on the Impact resistance of the various printed objects, 6.35 mm in thickness. As shown therein, a pronounced improvement in Impact resistance is observed when using RF71, compared to previously described formulations, already at 25% by weight of this formulation in the core. It is shown that in the ABS DM mode, when the core is surrounded by a shell, the Impact resistance is generally the same, irrespectively of the percentage of the first modeling formulation in the core. The same trend is observed for both tested formulations, indicating that the Impact resistance of the object is not affected by the relative amount of Part A in the core (but rather is mainly dependent on the composition of the shells).

The Effect of a DLM Concentration in the Core:

The effect of the concentration of a second modeling material formulation (or of the RF/DLM ratio) in the core, in a layered structure featuring a DM-ABS structure as described herein, on the Loss Modulus, Tg, Storage Modulus and Elastic Modulus was tested at various temperatures, using a second modeling formulation (DLM) referred to herein as Di-69, in combination with a first modeling material (RF) referred to herein as RF4w, or a first modeling material (RF) referred to herein as RF71.

The tested sample was a rectangle 3 mm overall thickness, overall length of 30 mm, with 17 mm between the two fixtures (span), and 13 mm width. Test was made in single cantilever mode, fabricated by a three-dimensional inkjet printing system, using a heated tray, at a temperature from ambient to 150° C.

The thickness of each layer was 32 μm. Each layer was printed by random interlacing in the core and/or the stitching layer, if present, of the respective first modeling formulation and a second modeling formulation to form a digital material.

Measurements were performed using a digital mechanical analysis (DMA) system, model Q800, available from TA Instruments, Inc., of New Castle, Del. The DMA system was operated in a single cantilever mode, oscillation mode, temperature ramp, frequency of 1 Hz and heating rate of 3° C./min.

Dynamic mechanical analysis was performed for the fabricated layered cores. The dynamic mechanical analysis provided the trigonometric function tan(δ), where δ is the phase between the stress σ and the strain ε. The function tan(δ) is a viscoelastic property that is correlated with the damping of the respective formulation, or, more specifically, the ability of the respective formulation to dissipate mechanical energy by converting the mechanical energy into heat.

Figure 12A:
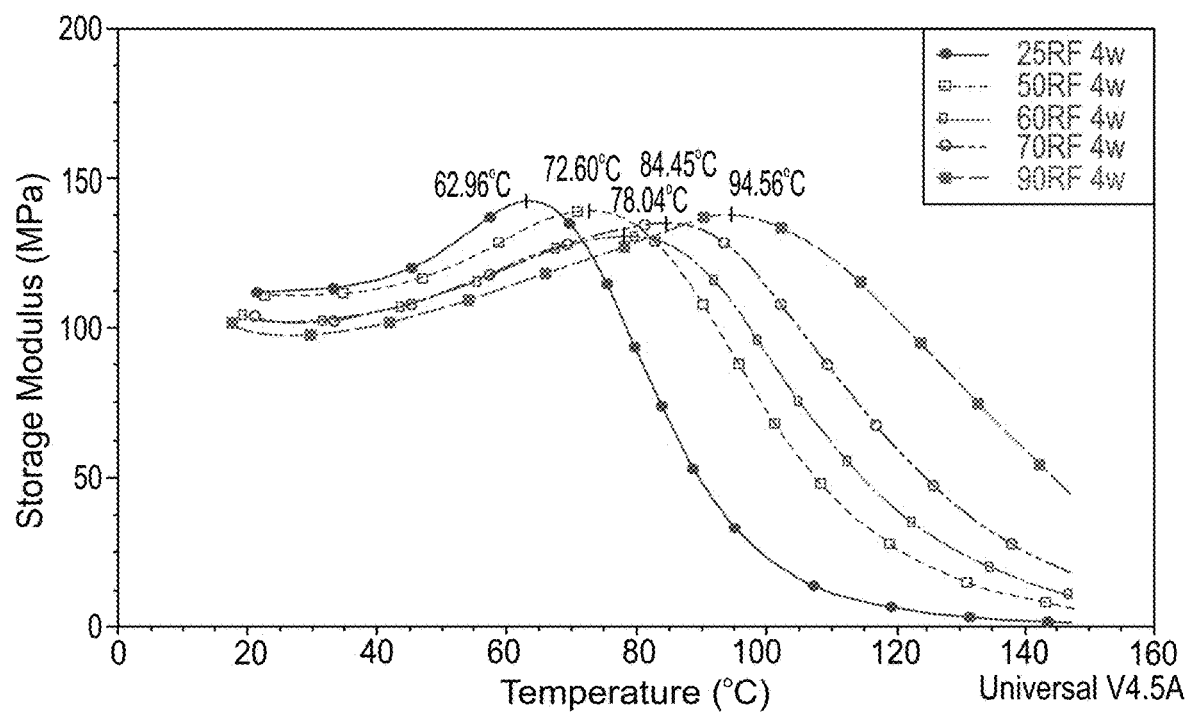
FIGS. 12A-12B present the effect of various concentrations of an exemplary modeling material formulations according to some embodiments of the present invention (referred to as RF4w) in the core of a fabricated object on the Loss modulus (FIG. 12A) and on the storage modulus (FIG. 12B) of the object at various temperatures.
Figure 12B:
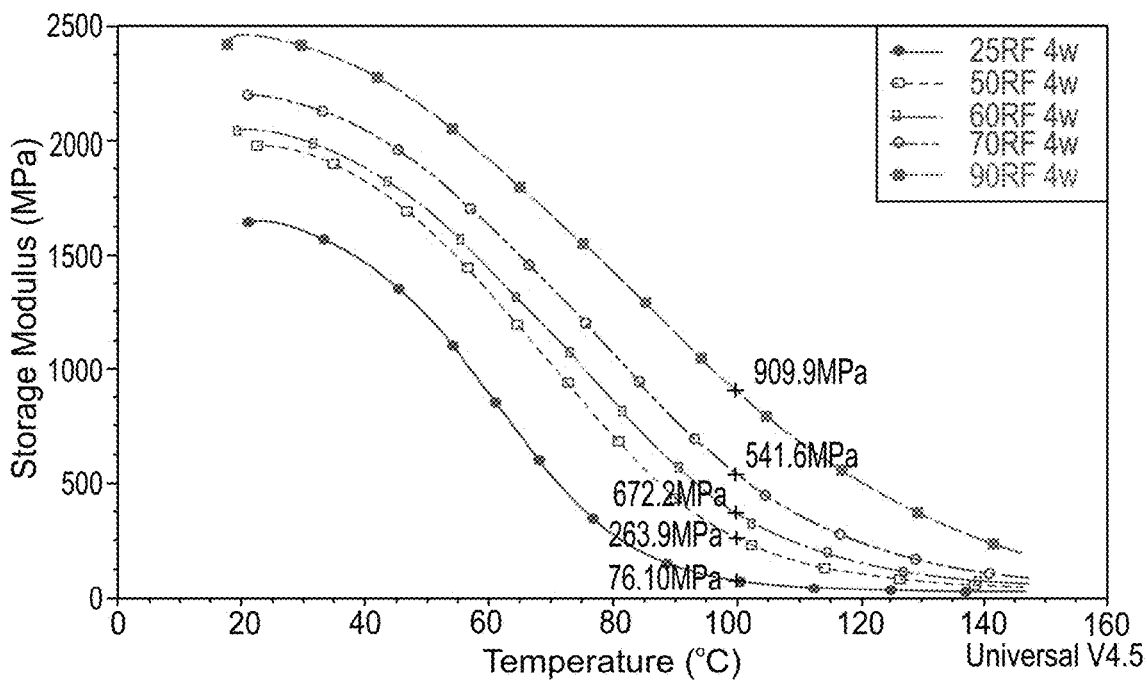

The results are presented in Tables 12 and 13 and FIGS. 12A and 12B, for various concentrations of Di-69 when used with RF4w as the RF formulation.

TABLE 12

| Di-69 (% wt.) | E' @ 100 C. (MPa) |
| --- | --- |
| 75 | 76.1 |
| 50 | 264 |
| 40 | 372 |
| 30 | 542 |
| 10 | 910 |

TABLE 13

| Di-69 (% wt.) | Tg (G") |
| --- | --- |
| 75 | 62.9 |
| 50 | 72.6 |
| 40 | 78 |
| 20 | 84.5 |
| 10 | 94.6 |

Figure 13A:
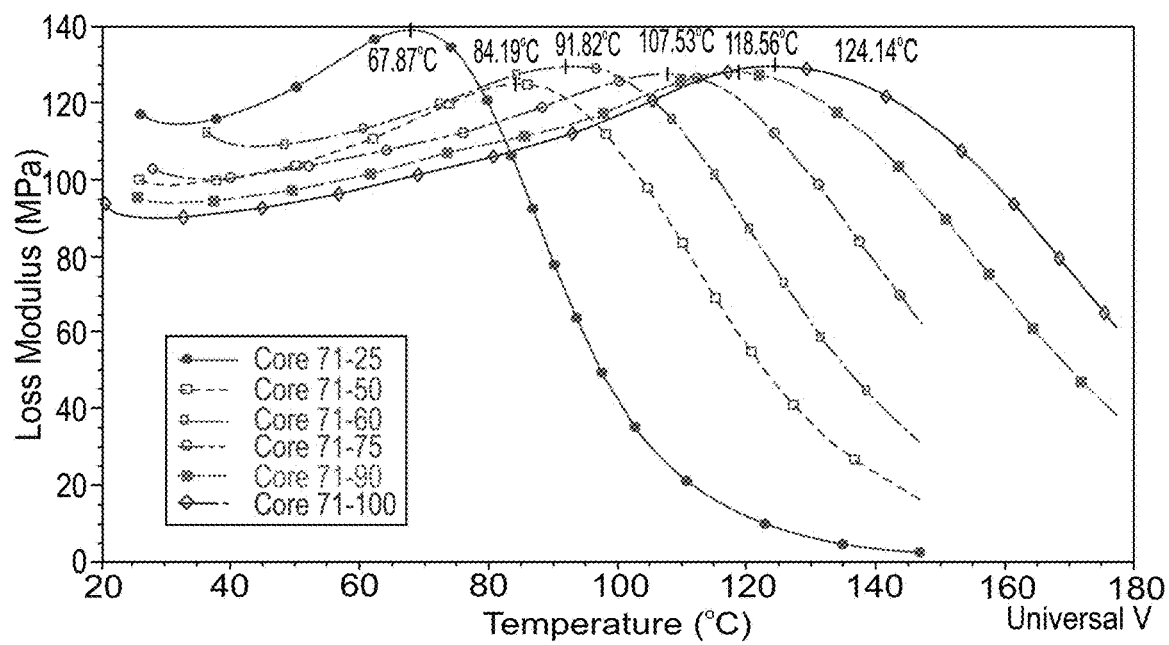
FIGS. 13A-13B present the effect of various concentrations of an exemplary modeling material formulations according to some embodiments of the present invention (referred to as RF71) in the core of a fabricated object on the Loss modulus (FIG. 13A) and on the storage modulus (FIG. 13B) of the object at various temperatures.
Figure 13B:
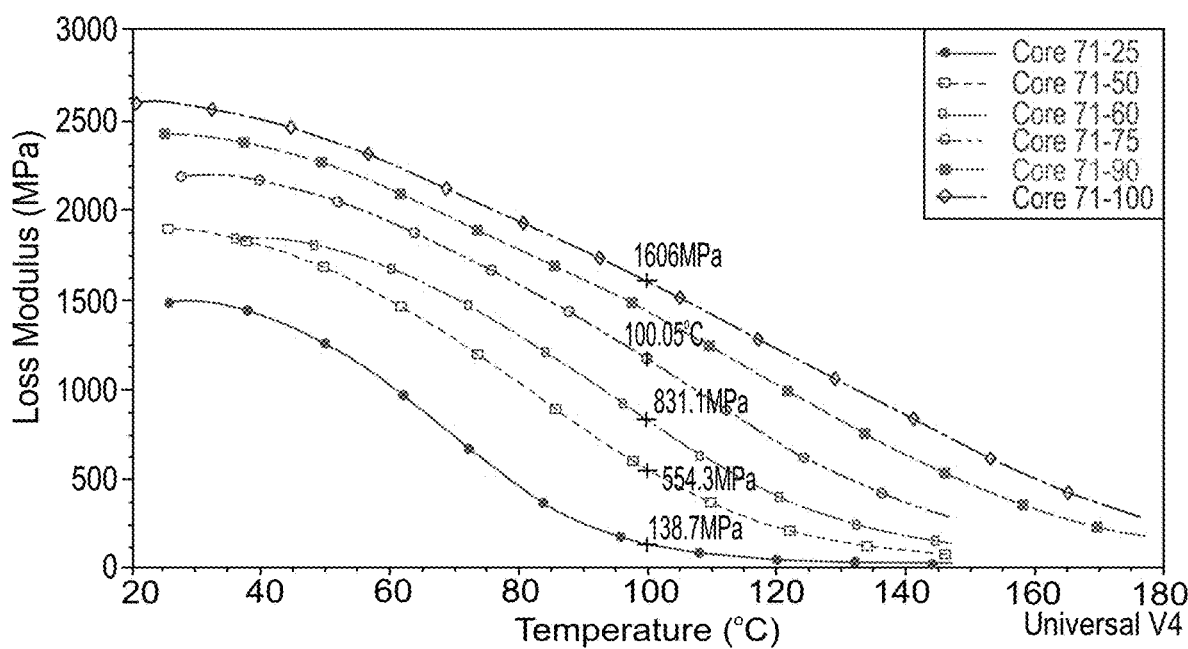

The same experiments were conducted using RF71, as described herein, as the RF formulation. The results are presented in Tables 14 and 15 and FIGS. 13A and 13B, for various concentrations of Di-69 when used with RF71 as the RF formulation.

TABLE 14

| Di-69 (% wt.) | Tg (G") |
|---|---|
| 75 | 67.9 |
| 50 | 84.2 |
| 40 | 91.8 |
| 25 | 107.5 |
| 10 | 118.6 |
| 0 | 124.1 |

TABLE 15

| Di-69 (% wt.) | E' @ 100 C. (MPa) |
|---|---|
| 75 | 139 |
| 50 | 554 |
| 40 | 831 |
| 25 | 1174 |
| 10 | 1350 |
| 0 | 1600 |

These data indicate that the concentration of the first and/or second formulation in the core can be manipulated in accordance with desired mechanical properties of the obtained object at an environmental temperature of its intended use.

The Effect of the RF/DLM Weight Ratio in the Core:

In further experiments conducted, exemplary RF formulations according to the present embodiments, RF71 and RF4w, and the previously described RF formulation RF 535, were tested in combination with a DLM formulation referred to herein as Di69, at various ratios, for the purpose of testing the effect of the ratio on the mechanical properties of an object made therefrom. DMA measurements were performed as described hereinabove, using a 3D-inkjet printed sample as described hereinabove.

The total calculated Tg values for these three types of first modeling formulation (obtained by sum of the individual Tg values of the respective components, weighted by the respective weight percentage, of each modeling formulation) are 127° C., 107° C. and 146° C., for RF 4w, RF 535 and RF 71, respectively.

Figure 14A:
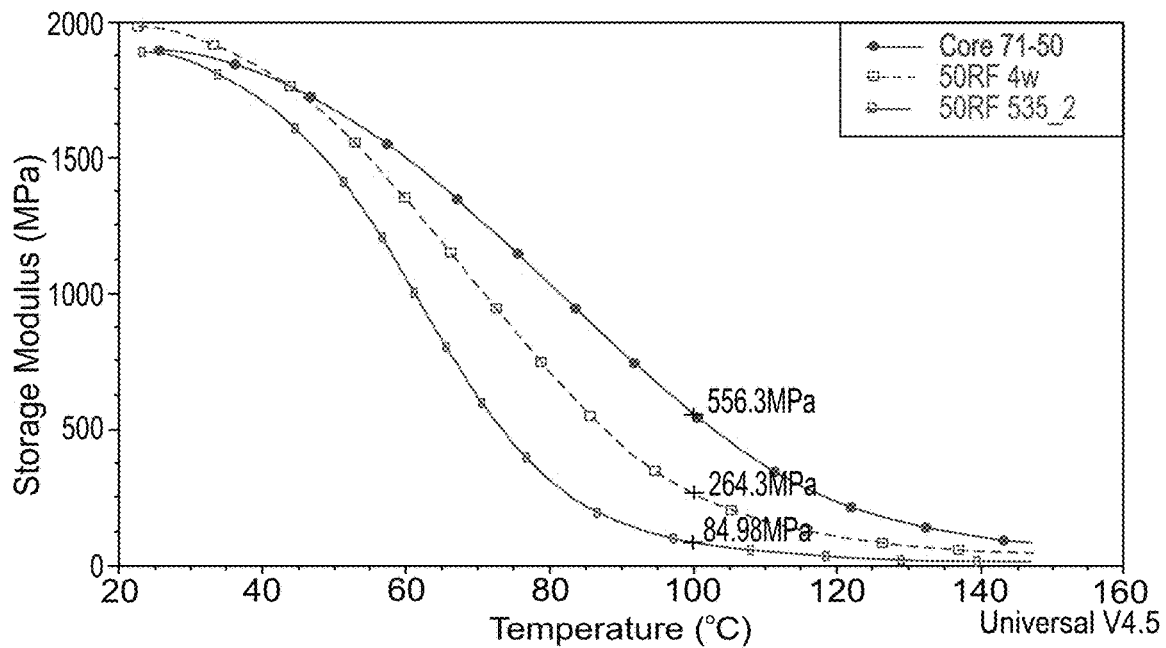
FIGS. 14A-14B present the effect of exemplary modeling material formulations according to some embodiments of the present invention (referred to as RF4w and RF71), and of RF535, when used at a 50/50 weight ratio (FIG. 14A) and at a 25/75 weight ratio (FIG. 14B) with a second modeling material formulation according to some embodiments of the present invention, on the storage modulus of the object at various temperatures.
Figure 14B:
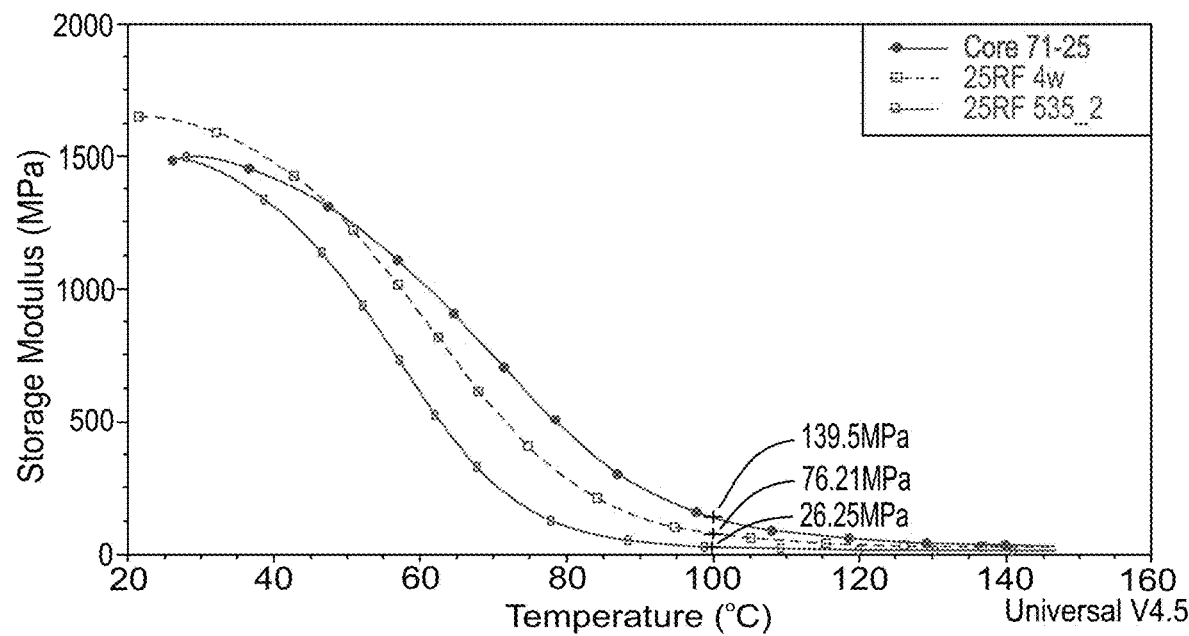

The data obtained for the Storage Modulus, at various temperatures, of RF 4w, RF 535 and RF 71 at a 50:50 (1:1) weight ratio is presented in Table 16 and FIG. 14A, and of RF 4w, RF 535 and RF 71 at a 25:75 (1:3) weight ratio is presented in Table 17 and FIG. 14B.

TABLE 16

| RF | E' @ 100 C. (MPa) |
|---|---|
| 535 | 85 |
| 4w | 265 |
| 71 | 560 |

TABLE 17

| RF | E' @ 100 C. (MPa) |
|---|---|
| 535 | 26 |
| 4w | 76 |
| 71 | 140 |

The Effect of Post Curing:

In further studies conducted, the effect of post-curing on the mechanical properties of the object, at various concentrations of each of the above-mentioned RF formulation was tested. For RF4w, it was found that post-curing results in an increase of the storage modulus up to 90° C., while at higher temperatures it has no substantial effect (data not shown). Post curing decreases the tan(o), whereby a more substantial decrease is seen at higher RF concentrations (data not shown). At temperatures higher than 100° C., lower tan($\delta$) and similar storage modulus are obtained for samples subjected or not to post-curing.

Figure 15A:
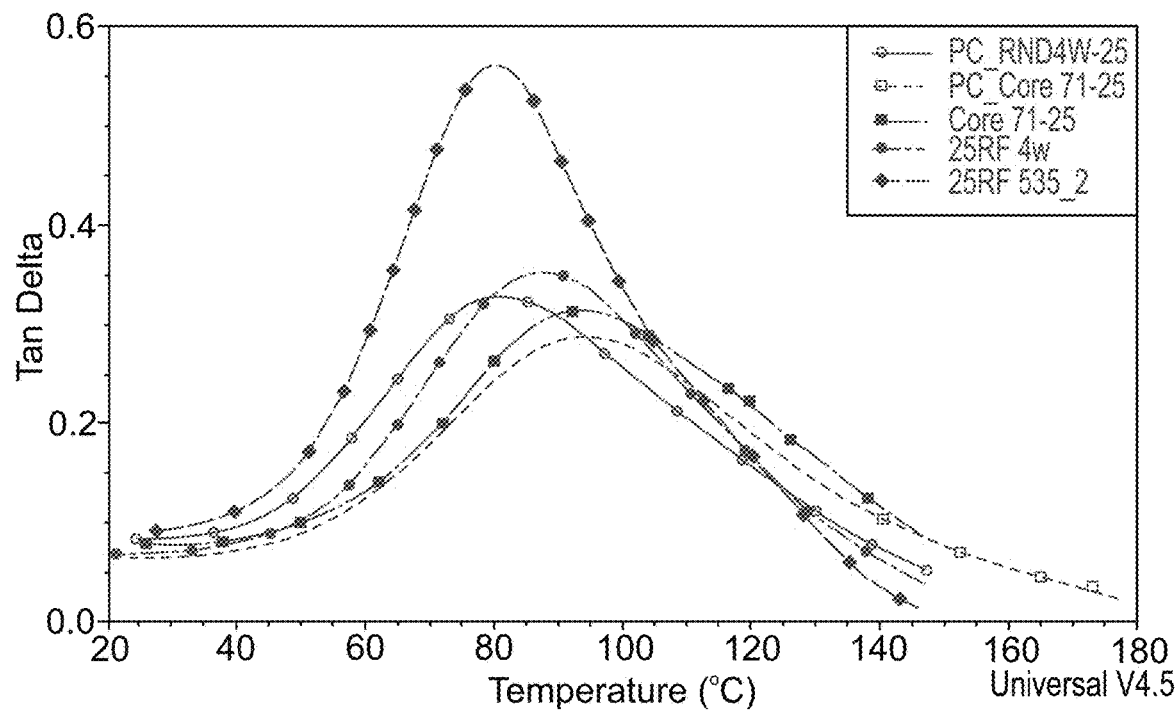
FIGS. 15A-15B present the effect of exemplary modeling material formulations according to some embodiments of the present invention (referred to as RF4w and RF71), and of RF535, when used at a 25/75 weight ratio (FIG. 15A) and at a 50/50 weight ratio (FIG. 15B) with a second modeling material formulation according to some embodiments of the present invention, in a dynamic mechanical analysis of an object fabricated according to some embodiments of the present invention.
Figure 15B:
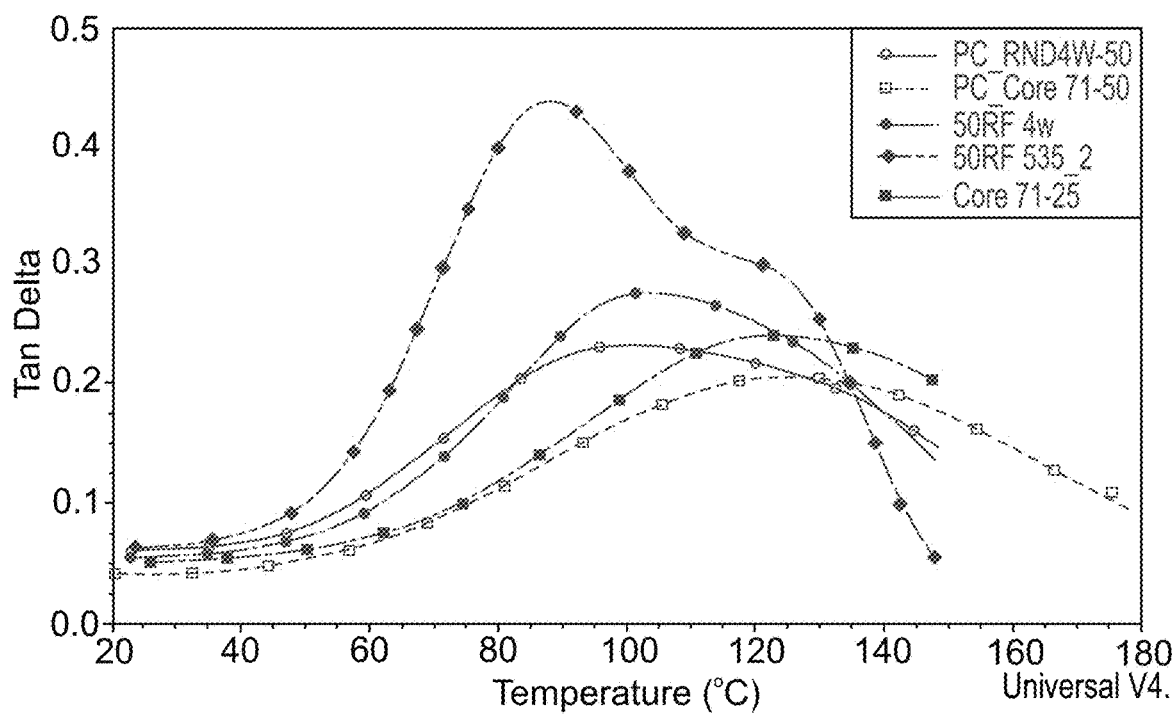

FIGS. 15A-15B show tan(o) as a function of the temperature, RF 4w, RF 535 and RF 71, at a 25/75 weight ratio between the first and second modeling formulation (FIG. 15A) and at a 50/50 weight ratio between the first and second modeling formulation (FIG. 15B). As shown therein, for all three types of the first modeling formulation, the location and width of the peak of tan(o) as a function of the temperature vary smoothly and monotonically when the weight percentage of the first modeling formulation is increased. Importantly, it can be seen that a first modeling material formulation according to the present embodiments, provides higher damping values is therefore usable when high damping is required for objects that are intended for use in an environmental temperature that is higher than 100° C., or higher than 110° C., or higher than 120° C., or higher.

The RF Composition:

The present inventors have further uncovered that when an additional (meth)acrylic flexible monomer having low Tg<−20° C., is added to a first (RF) formulation as described herein, the properties of the fabricated object can be further manipulated.

More specifically, the present inventors have uncovered that while such an addition of a flexible monomer may lead to a decrease in the HDT of the fabricated object (yet in HDT values as described herein, of at least 80 or at least 100° C.), properties such as elongation at break and toughness (brittleness) are improved, as described in further detail hereinunder.

The additional flexible monomer can be, for example, an ethoxylated monomer as described herein. The additional flexible monomer can be the same flexible (e.g., ethoxylated) monomer already included in a part A formulation as described herein, or, preferably, a different flexible monomer. An exemplary such additional flexible monomer is a poly(alkylene glycol) diacrylate, such as a poly(ethylene glycol) diacrylate, which features at least 5, preferably at least 10, e.g., from 10 to 15, alkylene glycol groups. An exemplary such additional flexible monomer is SR-610.

The weight ratio between a part A formulation as described herein and the additional flexible monomer can be in a range of from 70:30 to 95:5, or from 80:20 to 95:5, or from 85:15 to 95:5, or is 90:10.

Table 18 below presents a chemical composition of an exemplary RF formulation to which an additional flexible monomer was added. This RF formulation comprises 90% by weight of a formulation referred to herein as RF71, to which 10% by weight of SR-610, as an exemplary additional flexible monomer, was added, and which is referred to herein as RF71*.

TABLE 18

| Material | Wt. percentage (%) |
|---|---|
| Mono functional Acrylic monomer Tg > 85° C. | 9-27 |
| Multi functional Acrylic monomer Tg > 85° C. | 9-18 |
| SR 834 | ≥32% |

TABLE 18-continued

| Material | Wt. percentage (%) |
| --- | --- |
| (Meth)acrylic Oligomer, Tg > 50° C. | 9-18 |
| (Meth)acrylic flexible monomer, Having low Tg < −20° C | 4.5-13.5 |
| Inhibitor | 0.09-0.3 |
| Photoinitiator | 1.8-4.5 |
| Surfactant | 0.01-1 |
| Dispersant | 0.01-1 |
| Organic pigment | 0.5-0.15 |
| An additional (Meth)acrylic flexible monomer, Having low Tg < −20° C | 5-15 |

Exemplary objects were prepared using a part A formulation referred to herein as RF71, and using a part A formulation referred to herein as RF71*. Objects were printed in ABS DM 5160 and 5161 modes, using DI-69 as the Part B (DLM) formulation. Objects printed either is a glossy or matte mode, with a support material marketed as SUP 705 used in a matte mode.

As used herein throughout, the terms "glossy" and "matte" mode refer to the surface appearance of the printed model, after being subjected to post-curing (PC), or post-treatment (PT), as described herein.

In a matte mode, a support formulation is deposited concurrently immediately adjacent to the model. Due to a tendency for the support material and the modeling material to mix at the interface between them, the resulted object features a matte appearance of the model surface after support removal.

In a glossy mode, no support formulation is deposited concurrently immediately adjacent to the model, the model surface appears glossy.

Properties such as HDT and Elongation at break were determined for objects fabricated by glossy and matte modes, with and without post-treatment, according to the respective ASTM.

Measurements for determining properties reflecting the toughness (brittleness) of the fabricated objects were designed by the present inventors as follows:

Drop Test:

Glass-shaped objects were printed, featuring the following dimensions: Length—43 mm; Diameter—43 mm; and Wall Thickness—3 mm.

The glass-shaped objects were inserted into a round-shaped apparatus featuring at its center a void for holding the glass-shaped object. Pipes having a diameter slightly higher than 43 mm, and increasing heights, were placed above the glass-shaped object, and a metal weight of 352 grams was thrown through each pipe. The minimal height required to brake the glass by the falling metal weight was recorded.

Snap Test:

T-shape objects were printed, having the following dimensions: Length—40 mm; Width—20 mm; Snap thickness—2.5 and 4.0 mm.

The Snap objects were placed in a Snap device of a LLOYD 5K (Load cell 5K N) instrument, operated at a speed of 1 mm/minute, and the deflection required to break the snap part was recorded.

Impact test (Z Direction):

Bar objects were printed in Zx orientation, having the following dimensions: Length—65 mm; Width—12.7 mm; and Thickness—3 mm.

Impact resistance (Linear Resilience (J/m)) was recorded for each bar using a CHEAST Impact tester (non-notch).

Tables 19A and 19B present the data obtained for objects printed in a glossy mode (Table 19A) and a matte mode (Table 19B). Data is presented for objects subjected to post-treatment (PT), unless otherwise indicated. As shown, toughness and elongation of objects printed using RF71* are improved compared to RF71, while HDT slightly decreases.

TABLE 19A

| | HDT (No PT) (° C.) | HDT (PT) (° C.) | Elongation (%) | Drop test (cm) | Snap Xz 2.5 mm (mm) | Snap Xz 4.0 mm (mm) | Impact Zx (J/m) |
| --- | --- | --- | --- | --- | --- | --- | --- |
| RF71 | 108 ± 5 | 154 ± 1 | 8-11 | 55-65 | 2.12 ± 0.16 | 1.86 ± 0.03 | 698 ± 62 |
| RF71* | 85-90 | 118-125 | 14-19 | 180-200 | 4.4 ± 0.9 | 2.5 ± 0.2 | 855 ± 17 |

TABLE 19B

| | Drop test (cm) | Snap Xz 2.5 mm (mm) | Snap Xz 4.0 mm (mm) | Impact Zx (J/m) |
| --- | --- | --- | --- | --- |
| RF71 | 35-45 | 1.89 ± 0.17 | 2.15 ± 0.27 | 19.09 ± 1.39 |
| RF71* | 55-65 | 3.1 ± 0.8 | 2.0 ± 0.3 | 23.2 ± 1.4 |

The Printed Objects:

Table 20 below presents various properties of printed objects prepared according to some embodiments of the present invention.

Properties were determined according to the indicated ASTM, and compared to Stratasys product FDM Polycarbonate.

Object 1 refers to an ABS-DM object printed using RF71 and DI-69, according to the present embodiments, and Object 2 refers to an ABS-DM object printed using RF71* and DI-69, according to the present embodiments.

TABLE 20

| Property | ASTM | FDM Poly carbonate | Object 1 | Object 2 | Other printed objects |
| --- | --- | --- | --- | --- | --- |
| Tensile Strength (MPa) | D-638-03 | 57 | 57-62 | 52-60 | 55-60 |
| Tensile modulus (MPa) | D-638-04 | 1.944 | 2,600-3,000 | 2,000-2,500 | 2,600-3,000 |

TABLE 20-continued

| Property | ASTM | FDM Poly carbonate | Object 1 | Object 2 | Other printed objects |
|---|---|---|---|---|---|
| Elongation to Break (%) | D-638-05 | 4.8 | 8-11 (PT) | 14-19 (PT) | 25-40 |
| Elongation to Yield (%) | D-638-05 | 2.2 | 5-7 | 5-7 | 5-7 |
| Flexural strength (MPa) | D-790-03 | 89 | 59-68 | 55-75 | 65-75 |
| Flexural modulus (MPa) | D-790-04 | 2,006 | 1.562-1.766 | 1.400-2,100 | 1,700-2.200 |
| HDT 0.45 MPa Out of printer (° C.) | D-648-06 | | 88-107 | 90-100 | 58-68 |
| HDT 0.45 MPa After Thermal PT (° C.) | D-648-06 | 138 | 146-151 | 118-128 | 92-95 |
| Izod Noched Impact (J/m) | D-256-06 | 73 | 90-110 | 80-110 | 65-80 |

As can be seen in Table 20, an object prepared according to the present embodiments exhibits HDT and Impact resistance superior to polycarbonate and to objects made of previously disclosed formulations, while not compromising other properties.

Example 4

Controlling Properties of a Fabricated Object

The data presented herein (see, for example, Example 3) demonstrate that the first formulation, and/or the relative amount of the first and second formulations can be selected to enhance or reduce mechanical properties of the fabricated object. For example, selection of the first formulation and/or ratio that enhance the damping at high temperatures provides an object that is capable of dissipating energy, and that is less sensitive to internal stresses and crack propagation, when used in a high temperature environment. This applies to any first and second formulations, including, but not limited to, the first and second formulations of the present embodiments.

Accordingly, properties of a fabricated object can be controlled by judicious selection of the modeling formulations and/or ratio between a first and a second modeling formulation in the various regions of the object, particularly the core region, if a core-shell structure is fabricated. For example, a predetermined damping range of the core, the shell or the entire object can be obtained by selecting an amount of a first modeling formulation in the core, and/or by selecting one or more parameters characterizing the first formulation. The damping range can be expressed, for example, using the phase lag δ between the stress and the strain of the core, the shell or the entire object, for a particular temperature range.

In some of any of the embodiments described herein, the first and second formulations are characterized by, feature, or selected so as to feature, when hardened, the tangent of the phase lag between the stress and the strain of the respective structure (core, shell or the entire object), which is at least 0.25 at a temperature range of from about 70° C. to about 90° C., or at least 0.20 at a temperature range of from about 90° C. to about 110° C., or at least 0.15 at a temperature range of from about 110° C. to about 160° C., or at least 0.15 at a temperature range of from about 130° C. to about 160° C.]. Thus, for example, the first and second formulations can be selected so as to provide a desired damping performance at the environmental temperature at which a printed object is to be used.

For obtaining a desired damping performance, at a selected temperature, first and/or second modeling formulations, differing from one another by a characteristic parameter such as the extent of cross linking of the first formulation (expressed, for example, by the relative amount of a cross linking component (e.g., a multi-functional curable component) in the first formulation). The selected characteristic parameter can alternatively or additionally be a total calculated Tg of the first formulation, as calculated by summing individual Tg values of chemical components of first formulation. The summation is optionally and preferably a weight sum, wherein each Tg value is multiplied by the relative amount (e.g., weight percentage) of the respective chemical components of first modeling formulation.

For obtaining a characteristic parameter such as elongation and/or toughness, first modeling formulations, differing from one another by the presence or absence of an additional flexible monomer as described herein, can be used.

The selection of the characteristic parameter(s) can be achieved, for example, by a look-up table having a plurality of entries, each including a value indicative of the damping (e.g., the tangent of the phase δ) and a corresponding parameter or set of parameters (weight percentage of the first modeling formulation in the core, extent of cross linking, total calculated Tg, etc.) corresponding to the damping. The selection of the characteristic parameter(s) can alternatively or additionally be achieved by one or more calibration curves describing a value indicative of the damping as a function of the respective parameter. Representative examples of such calibration curves are provided in the Examples section that follows (see, FIGS. 15A-15B).

In various exemplary embodiments of the invention the selection is performed by a data processor, e.g., data processor 24 or 154. For example, the operator can enter, via a user interface, the desired damping or damping range, and the processor can access a memory medium storing a digital representation of the look-up table or calibration curve, and display or automatically select the parameter or set of parameters that provide the desired damping or damping range. The selection can optionally and preferably be based on the type of modeling formulations that are loaded to the fabrication system (e.g., the type of modeling formulations in supply apparatus 330), so that the data processor selects only the parameters that are applicable to modeling formulations already loaded into the system. Alternatively, the operator can also enter via the user interface, the desired modeling formulation, in which case the data processor selects only the parameters that are applicable to the modeling formulation that was entered by the operator.

In some embodiments, the modeling material formulations described herein in any of the respective embodiments, form a part of the above-described look-up table.

In some embodiments of the present invention the total calculated Tg value of the first modeling formulation is from about 100° C. to about 115° C., e.g., about 107° C.

In some embodiments of the present invention the total calculated Tg value of the first modeling formulation is from about 120° C. to about 135° C., e.g., about 127° C. In some embodiments of the present invention the total calculated Tg value of the first modeling formulation is from about 140° C. to about 152° C., e.g., about 146° C.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A structure comprises a plurality of layers fabricated by three-dimensional inkjet printing, wherein at least one of said layers comprising:
   an innermost region formed of a combination of a first modeling material and a second modeling material interlaced thereamongst;
   an inner envelope region, at least partially surrounding said innermost region, and being formed of said first modeling material, but not said second modeling material;
   an outer envelope region, at least partially surrounding said inner envelope region, and being formed of said second modeling material, but not said first modeling material; and
   a stitching region between said inner envelope region and said outer envelope region,
   wherein said stitching region is formed of a combination of said first modeling material and said second modeling material interlaced thereamongst.

2. The structure of claim 1, wherein said inner envelope region completely surrounds said innermost region.

3. The structure of claim 1, wherein said outer envelope region completely surrounds said inner envelope region.

4. The structure of claim 1, wherein a ratio between an area of said innermost region that is occupied by said first modeling material and an area of said innermost region that is occupied by said second modeling material is about 0.25 to about 0.45.

5. The structure of claim 1, wherein a thickness of said inner envelope region, as measured within the plane of said layer, is from about 0.1 mm to about 4 mm.

6. The structure of claim 1, wherein a thickness of said outer envelope region, as measured within the plane of said layer, is from about from about 150 microns to about 600 microns.

7. The structure of claim 1, wherein a ratio between an area of said stitching region that is occupied by said first modeling material and an area of said stitching region that is occupied by said second modeling material is about 0.9 to about 1.1.

8. The structure of claim 1, wherein said stitching region is devoid of any modeling material other than said first modeling material and said second modeling material.

9. The structure of claim 1, wherein a thickness of said stitching region is less than a thickness of said inner envelope region and less than a thickness said outer envelope region, said thicknesses being measured within the plane of said layer.

10. The structure of claim 1, wherein said thickness of said stitching region is from about 70 microns to about 100 microns.

11. The structure of claim 1, comprising a plurality of base section layers forming a base of the structure, and a plurality of top section layers forming a top of the structure.

12. The structure of claim 11, wherein at least one of said plurality of base section layers and said plurality of top section layers is formed of a combination of said first modeling material and said second modeling material interlaced thereamongst.

13. The structure of claim 11, wherein at least one of a bottommost layer of said top and a topmost layer of said base is formed of said first modeling material, but not said second modeling material.

14. The structure of claim 11, wherein said bottommost layer of said top is a bottommost layer of a stack of layers all made of said first modeling material, but not said second modeling material, and wherein a thickness of said stack measured perpendicularly to said layers is approximately the same as a thickness of said inner envelope region, as measured within the plane of said layer.

15. The structure of claim 11, wherein said topmost layer of said base is a topmost layer of a stack of layers all made of said first modeling material, but not said second modeling material, and wherein a thickness of said stack measured perpendicularly to said layers is approximately the same as a thickness of said inner envelope region, as measured within the plane of said layer.

16. The structure of claim 11, wherein at least one of a bottommost layer of said base and a topmost layer of said top is formed of said second modeling material, but not said first modeling material.

17. The structure of claim 11, wherein said bottommost layer of said base is a bottommost layer of a stack of layers all made of said second modeling material, but not said first modeling material, and wherein a thickness of said stack measured perpendicularly to said layers is approximately the same as a thickness of said outer envelope region, as measured within the plane of said layer.

18. The structure of claim 11, wherein said topmost layer of said top is a topmost layer of a stack of layers all made of said second modeling material, but not said first modeling material, and wherein a thickness of said stack measured perpendicularly to said layers is approximately the same as a thickness of said outer envelope region, as measured within the plane of said layer.

19. The structure of claim 1, wherein said first modeling material is characterized by heat deflection temperature (HDT) of at least 90° C., and said second modeling material is characterized by Izod impact resistance (IR) value of at least 45 J/m.

20. The structure of claim 1, wherein a ratio between elastic moduli of said first and said second modeling materials is from about 2.7 to about 2.9.

* * * * *